United States Patent
Lee et al.

(10) Patent No.: US 12,307,357 B2
(45) Date of Patent: May 20, 2025

(54) NPU AND SOC BEING OPERATED BASED ON TWO OR MORE DIFFERENT CLOCK SIGNALS

(71) Applicant: DEEPX CO., LTD., Seongnam-si (KR)

(72) Inventors: Seong Jin Lee, Seongnam-si (KR); Jung Boo Park, Seoul (KR); Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/595,047

(22) Filed: Mar. 4, 2024

(65) Prior Publication Data

US 2025/0045574 A1 Feb. 6, 2025

Related U.S. Application Data

(63) Continuation of application No. 18/459,605, filed on Sep. 1, 2023, now Pat. No. 11,954,586.

(30) Foreign Application Priority Data

Aug. 4, 2023 (KR) ......................... 10-2023-0102351

(51) Int. Cl.
*G06N 3/063* (2023.01)
(52) U.S. Cl.
CPC .................................. *G06N 3/063* (2013.01)
(58) Field of Classification Search
CPC ...................................................... G06N 3/063
See application file for complete search history.

(56) References Cited

U.S. PATENT DOCUMENTS

| 2018/0253643 | A1 | 9/2018 | Buchanan et al. |
| 2019/0079801 | A1* | 3/2019 | Lyuh .................. G06F 15/8046 |
| 2021/0174179 | A1 | 6/2021 | Song et al. |
| 2021/0247797 | A1 | 8/2021 | Gu et al. |

FOREIGN PATENT DOCUMENTS

KR 10-2022-0142333 A 10/2022

OTHER PUBLICATIONS

Hyman, Ransford et al., "A clock control strategy for peak power and RMS current reduction using path clustering.", IEEE Transactions on very large scale integration (VLSI) systems, 2012, 21.2: 259-269.

* cited by examiner

*Primary Examiner* — Brent Johnston Hoover
(74) *Attorney, Agent, or Firm* — Bridgeway IP Law Group, PLLC; Jihun Kim

(57) ABSTRACT

A neural processing unit may comprise a first circuitry including a plurality of processing elements (PEs) configured to perform operations of an artificial neural network model, the plurality of PEs including an adder, a multiplier, and an accumulator, and a clock signal supply circuitry configured to output one or more clock signals. When the plurality of PEs include a first group of PEs and a second group of PEs, a first clock signal among the one or more clock signals, may be supplied to the first group of PEs and a second clock signal among the one or more clock signals, may be supplied to the second group of PEs. At least one of the first and second clock signals may have a preset phase based on a phase of an original clock signal.

20 Claims, 18 Drawing Sheets

FIG. 6B

| Layer name | Input feature map | | | Kernel | | | Output feature map | | | | Algorithm | | 연산량 | Data size (Byte) | | |
|---|---|---|---|---|---|---|---|---|---|---|---|---|---|---|---|---|
| | Height | Width | Ch # | Height | Width | # | Height | Width | Ch # | Strides | AVG_pooling | Activation | MAC | Kernel_SIZE | IFMAP_SIZE | OFMAP_SIZE |
| 1 | 224 | 224 | 3 | 3 | 3 | 32 | 112 | 112 | 32 | 2 | NO | RELU | 10,838,016 | 864 | 150,528 | 401,408 |
| 2 | 112 | 112 | 32 | 3 | 3 | 1 | 112 | 112 | 32 | 1 | NO | RELU | 3,612,672 | 288 | 401,408 | 401,408 |
| 3 | 112 | 112 | 32 | 1 | 1 | 64 | 112 | 112 | 64 | 1 | NO | RELU | 25,690,112 | 2,048 | 401,408 | 802,816 |
| 4 | 112 | 112 | 64 | 3 | 3 | 1 | 56 | 56 | 64 | 2 | NO | RELU | 1,806,336 | 576 | 802,816 | 200,704 |
| 5 | 56 | 56 | 64 | 1 | 1 | 128 | 56 | 56 | 128 | 1 | NO | RELU | 25,690,112 | 8,192 | 200,704 | 401,408 |
| 6 | 56 | 56 | 128 | 3 | 3 | 1 | 56 | 56 | 128 | 1 | NO | RELU | 3,612,672 | 1,152 | 401,408 | 401,408 |
| 7 | 56 | 56 | 128 | 1 | 1 | 128 | 56 | 56 | 128 | 1 | NO | RELU | 51,380,224 | 16,384 | 401,408 | 401,408 |
| 8 | 56 | 56 | 128 | 3 | 3 | 1 | 28 | 28 | 128 | 2 | NO | RELU | 903,168 | 1,152 | 401,408 | 100,352 |
| 9 | 28 | 28 | 128 | 1 | 1 | 256 | 28 | 28 | 256 | 1 | NO | RELU | 25,690,112 | 32,768 | 100,352 | 200,704 |
| 10 | 28 | 28 | 256 | 3 | 3 | 1 | 28 | 28 | 256 | 1 | NO | RELU | 1,806,336 | 2,304 | 200,704 | 200,704 |
| 11 | 28 | 28 | 256 | 1 | 1 | 256 | 28 | 28 | 256 | 1 | NO | RELU | 51,380,224 | 65,536 | 200,704 | 200,704 |
| 12 | 28 | 28 | 256 | 3 | 3 | 1 | 14 | 14 | 256 | 2 | NO | RELU | 451,584 | 2,304 | 200,704 | 50,176 |
| 13 | 14 | 14 | 256 | 1 | 1 | 512 | 14 | 14 | 512 | 1 | NO | RELU | 25,690,112 | 131,072 | 50,176 | 100,352 |
| 14 | 14 | 14 | 512 | 3 | 3 | 1 | 14 | 14 | 512 | 1 | NO | RELU | 903,168 | 4,608 | 100,352 | 100,352 |
| 15 | 14 | 14 | 512 | 1 | 1 | 512 | 14 | 14 | 512 | 1 | NO | RELU | 51,380,224 | 262,144 | 100,352 | 100,352 |
| 16 | 14 | 14 | 512 | 3 | 3 | 1 | 14 | 14 | 512 | 1 | NO | RELU | 903,168 | 4,608 | 100,352 | 100,352 |
| 17 | 14 | 14 | 512 | 1 | 1 | 512 | 14 | 14 | 512 | 1 | NO | RELU | 51,380,224 | 262,144 | 100,352 | 100,352 |
| 18 | 14 | 14 | 512 | 3 | 3 | 1 | 14 | 14 | 512 | 1 | NO | RELU | 903,168 | 4,608 | 100,352 | 100,352 |
| 19 | 14 | 14 | 512 | 1 | 1 | 512 | 14 | 14 | 512 | 1 | NO | RELU | 51,380,224 | 262,144 | 100,352 | 100,352 |
| 20 | 14 | 14 | 512 | 3 | 3 | 1 | 14 | 14 | 512 | 1 | NO | RELU | 903,168 | 4,608 | 100,352 | 100,352 |
| 21 | 14 | 14 | 512 | 1 | 1 | 512 | 14 | 14 | 512 | 1 | NO | RELU | 51,380,224 | 262,144 | 100,352 | 100,352 |
| 22 | 14 | 14 | 512 | 3 | 3 | 1 | 14 | 14 | 512 | 1 | NO | RELU | 903,168 | 4,608 | 100,352 | 100,352 |
| 23 | 14 | 14 | 512 | 1 | 1 | 512 | 14 | 14 | 512 | 1 | NO | RELU | 51,380,224 | 262,144 | 100,352 | 100,352 |
| 24 | 14 | 14 | 512 | 3 | 3 | 1 | 7 | 7 | 512 | 2 | NO | RELU | 225,792 | 4,608 | 100,352 | 25,088 |
| 25 | 7 | 7 | 512 | 1 | 1 | 1,024 | 7 | 7 | 1,024 | 1 | NO | RELU | 25,690,112 | 524,288 | 25,088 | 50,176 |
| 26 | 7 | 7 | 1024 | 3 | 3 | 1 | 7 | 7 | 1,024 | 1 | NO | RELU | 451,584 | 9,216 | 50,176 | 50,176 |
| 27 | 7 | 7 | 1024 | 1 | 1 | 1,024 | 7 | 7 | 1,024 | 1 | YES | RELU | 51,380,224 | 1,048,576 | 50,176 | 1,024 |
| 28 | 1 | 1 | 1024 | 1 | 1 | 1,000 | 1 | 1 | 1,000 | 1 | NO | NO | 1,024,000 | 1,024,000 | 1,024 | 1,000 |

NPU AND SOC BEING OPERATED BASED ON TWO OR MORE DIFFERENT CLOCK SIGNALS

CROSS-REFERENCE TO RELATED APPLICATIONS

This application is a continuation application of the U.S. Utility patent application Ser. No. 18/459,605 filed on Sep. 1, 2023, which claims the priority of Korean Patent Application No. 10-2023-0102351 filed on Aug. 4, 2023, in the Korean Intellectual Property Office, the disclosure of which is incorporated herein by reference.

BACKGROUND OF THE DISCLOSURE

Technical Field

The present disclosure relates to a technique for lowering instantaneous power consumption of a neural processing unit.

Background Art

Artificial intelligence (AI) is rapidly advancing. AI refers to artificially imitating human intelligence, that is, intelligence capable of recognition, classification, inference, prediction, control/decision making, and the like.

In recent times, to enhance the computational speed for artificial intelligence (AI), a neural processing unit (NPU) has been developed.

Depending on the specific AI service requirements, different types of artificial neural network (ANN) models may exist. For instance, when processing an image or video, a CNN type artificial neural network model can be employed for tasks like object classification, object detection, object tracking, and the like.

Generally, each layer of an artificial neural network model involves varying levels of computation.

In particular, when a specific layer requires a significant increase in computational operations, it can lead to an instantaneous surge in power consumption of a neural processing unit.

SUMMARY OF THE DISCLOSURE

Artificial neural network operation has a data-intensive characteristic. In particular, artificial neural network calculations require parallel processing calculations. In other words, the artificial neural network operation has a characteristic in that the processing speed is lowered if a large amount of data cannot be processed in parallel at a high speed at the same time.

Accordingly, the inventors of the present disclosure developed a neural processing unit specialized for artificial neural network calculation. The inventors of the present disclosure have attempted to improve the parallel processing performance of the neural processing unit by increasing the number of a plurality of processing elements of the neural processing unit. In addition, the inventors of the present disclosure have attempted to develop a neural processing unit capable of low-power operation.

Meanwhile, a power supply unit of a neural processing unit specialized for low-power operation installed in an edge device may have relatively low power supply capability compared to a power supply unit of a graphic processing unit (GPU) operating in a server or personal computer (PC). In addition, capacitance of a power supply unit of a neural processing unit specialized for low-power operation installed in an edge device may be insufficient to handle peak power supply.

However, the inventors of the present disclosure have recognized that as the number of processing elements of the neural processing unit specialized for low-power operation increases, the degree of instantaneously fluctuating supply voltage may increase. In other words, the required amount of instantaneous power supply of the neural processing unit may be proportional to the number of operating processing elements. In addition, the amount of computation of the artificial neural network model varies considerably for each layer. Therefore, the number of processing elements operating in parallel may be different according to the amount of computation of the layer of the artificial neural network model. That is, when many processing elements operate at the same time, the voltage of the power supply unit of the neural processing unit may fluctuate or drop instantaneously.

In addition, when the supply voltage fluctuates or drops instantaneously, there may be a case in which the supply voltage VDD needs to be raised for system stability. Therefore, if system safety is not secured, a problem in which the supply voltage is unnecessarily increased may occur. When the supply voltage increases, power consumption of the neural processing unit may rapidly increase.

Conversely, as the supply voltage becomes more stable, a level of the supply voltage VDD can be reduced. Therefore, if the stability of the supply voltage of the neural processing unit is ensured, the supply voltage can be reduced, and consequently, the power consumption of the neural processing unit can be reduced.

Accordingly, the inventors of the present disclosure recognized that it is necessary to improve the stability of a supply voltage of a neural processing unit specialized in artificial neural network operation even when the number of processing elements increases.

Accordingly, the disclosures in the present disclosure are aimed at disclosing technical solutions for stabilizing the fluctuation of the supply voltage of the supply power unit due to excessive peak power.

According to an example of the present disclosure, a neural processing unit may be provided. The NPU may comprise a first circuitry including a plurality of processing elements (PEs) configured to perform operations of an artificial neural network model, the plurality of PEs including an adder, a multiplier, and an accumulator, and a clock signal supply circuitry configured to output one or more clock signals. When the plurality of PEs include a first group of PEs and a second group of PEs, a first clock signal among the one or more clock signals, may be supplied to the first group of PEs and a second clock signal among the one or more clock signals, may be supplied to the second group of PEs. At least one of the first and second clock signals may have a preset phase based on a phase of an original clock signal.

The at least one of the first and second clock signals may be generated by shifting, drifting, or delaying the phase of the original clock signal.

The second clock signal may have a second phase different from a first phase of the first clock signal.

The one or more clock signals may include the first clock signal and the second clock signal. The first clock signal may have a first phase different from a second phase of the second clock signal, but has a same phase as the original clock signal.

A phase difference between the first and second clock signals may be determined in consideration of a peak power of the NPU.

The first group of PEs may operate based on a first phase of the first clock signal and the second group of PEs may operate based on a second phase of the second clock signal so as to reduce a peak power of the NPU.

When the plurality of PEs may further include a third group of PEs, a third clock signal among the one or more clock signals, may be supplied to the third group of PEs.

A number of the one or more clock signals may be preset based on a number of groups of the plurality of PEs.

According to an example of the present disclosure, a system-on-chip (SoC) may be provided. The Soc may comprise a semi-conductor substrate, a first circuitry, disposed on the semi-conductor substrate, including a plurality of processing elements (PEs) configured to perform operations of an artificial neural network model, the plurality of PEs including an adder, a multiplier, and an accumulator, and a clock signal supply circuitry, disposed on the semi-conductor substrate, configured to output one or more clock signals. When the plurality of PEs include a first group of PEs and a second group of PEs, a first clock signal among the one or more clock signals, may be supplied to the first group of PEs and a second clock signal among the one or more clock signals, may be supplied to the second group of PEs. At least one of the first and second clock signals may have a preset phase based on a phase of an original clock signal.

The at least one of the first and second clock signals may be generated by shifting, drifting, or delaying the phase of the original clock signal.

The second clock signal may have a second phase different from a first phase of the first clock signal.

The one or more clock signals may include the first clock signal and the second clock signal. The first clock signal may have a first phase different from a second phase of the second clock signal, but has a same phase as the original clock signal.

A phase difference between the first and second clock signals may be determined in consideration of a peak power of the SoC.

The first group of PEs may operate based on a first phase of the first clock signal and the second group of PEs may operate based on a second phase of the second clock signal so as to reduce a peak power of the SoC.

When the plurality of PEs further include a third group of PEs, a third clock signal among the one or more clock signals, may be supplied to the third group of PEs.

A number of the one or more clock signals may be preset based on a number of groups of the plurality of PEs.

A method of operating a neural processing unit (NPU) may be provided. The method of operating the NPU may comprise steps of generating a plurality of clock signals including a first clock signal and a second clock signal; operating a first group of processing elements (PEs) based on the first clock signal; and operating a second group of PEs based on the second clock signal. The PEs of the first and second groups may include an adder, a multiplier, and an accumulator, and may be configured to process operations of an artificial neural network model.

The at least one of the first and second clock signals may be generated by shifting, drifting, or delaying a phase of an original clock signal.

The second clock signal may have a second phase different from a first phase of the first clock signal.

A number of the plurality of clock signals may be preset based on a number of groups of the PEs.

According to examples of the present disclosure, an artificial neural network operation is performed in a distributed manner according to a plurality of clock signals, thereby reducing peak power.

According to examples of the present disclosure, an artificial neural network operation is performed in a distributed manner according to a plurality of clock signals, thereby improving the stability of a supply voltage supplied to a neural processing unit.

According to the examples of the present disclosure, the artificial neural network operations are distributed according to a plurality of clock signals, so that the power consumption of the neural processing unit can be significantly reduced by reducing the supply voltage supplied to the neural processing unit.

BRIEF DESCRIPTION OF THE DRAWINGS

FIG. 6B is an exemplary table showing the size of data for each layer in the exemplary artificial neural network model shown in FIG. 6A.

DETAILED DESCRIPTION OF THE EMBODIMENT

Figure 1:
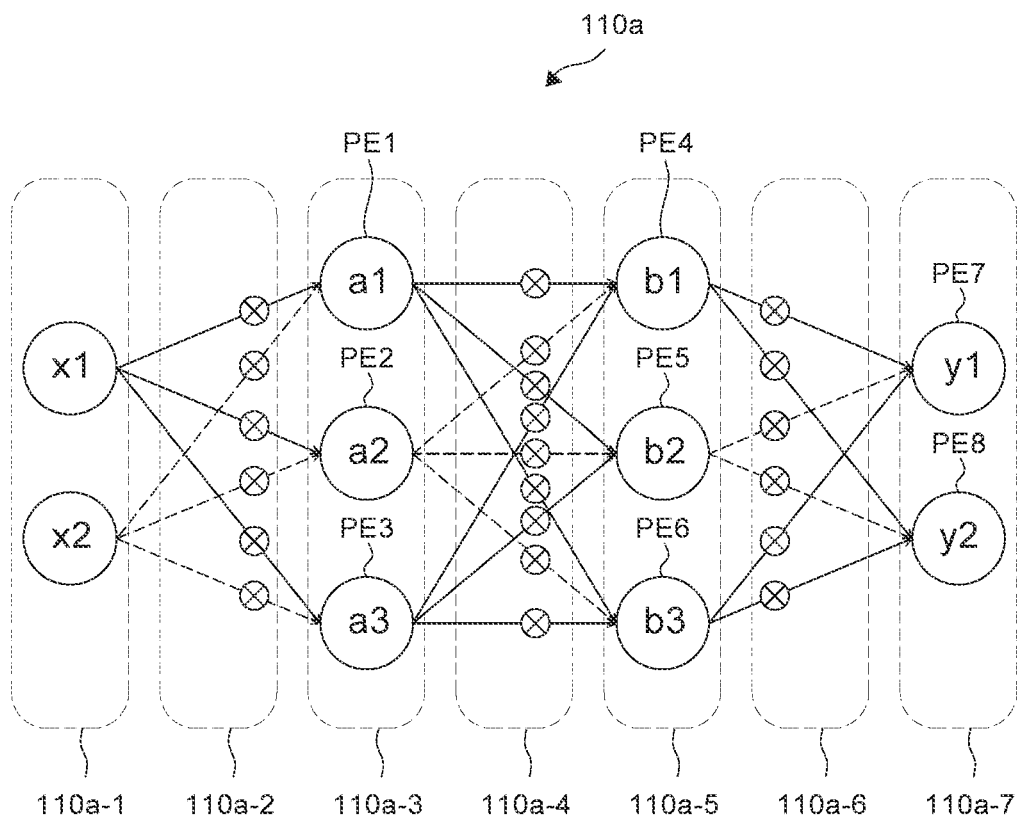
FIG. 1 is a schematic conceptual diagram illustrating an exemplary artificial neural network model.

Specific structural or step-by-step descriptions for the embodiments according to the concept of the present disclosure disclosed in the present disclosure or application are merely illustrative for the purpose of describing the embodiments according to the concept of the present disclosure. The examples according to the concept of the present disclosure may be carried out in various forms and are not interpreted as that the present disclosure is limited to the examples described in the present disclosure or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are in line with the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present disclosure are used only to describe specific examples, and are not intended to limit the present disclosure. A singular form may include a plural form if there is no clearly opposite meaning in the context. In the present disclosure, it should be understood that terms "include" or "have" indicate that a feature, a number, a step, an operation, a component, a part, or a combination thereof described in the present disclosure is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in the present disclosure.

In describing examples, descriptions of technical contents that are well known in the art to which the present disclosure pertains and are not directly related to the present disclosure will be omitted. The omission is to convey the gist of the present disclosure more clearly without the obscuration of the unnecessary description of well-known technical details.

Definitions of Terms

Here, in order to help the understanding of the examples proposed in the present disclosure, terminologies used in the present disclosure will be defined in brief.

NPU is an abbreviation for a neural processing unit and refers to a processor specialized for an operation of an artificial neural network model separately from the central processor (CPU).

ANN is an abbreviation for an artificial neural network and refers to a network which connects nodes in a layered structure by imitating the connection of the neurons in the human brain through a synapse to imitate the human intelligence.

DNN is an abbreviation for a deep neural network and may mean that the number of hidden layers of the artificial neural network is increased to implement higher artificial intelligence.

CNN is an abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by explaining examples of the present disclosure with reference to the accompanying drawings.

<Artificial Intelligence>

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. In order to imitate human intelligence, modeling the operating principle of biological neurons and the connection between neurons is called an artificial neural network model. In other words, an artificial neural network is a system in which nodes that imitate neurons are connected in a layer structure.

These artificial neural network models are divided into 'single-layer neural networks' and 'multi-layer neural network' according to the number of layers. A typical multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts characteristics, and transfers them to the output layer. (3) The output layer receives signals from the hidden layer and outputs the result. The input signal between neurons is multiplied by each connection weight having a value between 0 and 1 and summed. If this sum is greater than the neuron's threshold, the neuron is activated and implemented as an output value through an activation function.

Meanwhile, in order to implement higher artificial intelligence, an artificial neural network in which the number of hidden layers is increased is called a deep neural network (DNN).

DNNs are being developed in various structures. For example, a convolutional neural network (CNN), which is an example of DNN, is known to be easy to extract features of an input value (video or image) and identify a pattern of the extracted output value. A CNN may be configured in a form in which a convolution operation, an activation function operation, a pooling operation, and the like are processed in a specific order.

For example, in each layer of the DNN, parameters (i.e., input values, output values, weights or kernels, and the like) may be a matrix composed of a plurality of channels. Parameters can be processed in the NPU by convolution or matrix multiplication. In each layer, an output value that has been processed is generated.

For example, a transformer is a DNN based on attention technology. Transformers utilize a number of matrix multiplication operations. The transformer may obtain an output value of attention (Q, K, V) by using parameters such as an input value and a query (Q), a key (K), and a value (V). The transformer can process various inference operations based on the output value (i.e., attention (Q, K, V)). Transformers tend to show better inference performance than CNNs.

FIG. 1 illustrates an exemplary artificial neural network model.

Hereinafter, an operation of an exemplary artificial neural network model 110a which may operate in the neural processing unit 100 will be explained.

The exemplary artificial neural network model 110a of FIG. 1 may be an artificial neural network trained to perform various inference functions such as object detection or voice recognition.

The artificial neural network model 110a may be a deep neural network (DNN).

However, the artificial neural network model 110a according to the examples of the present disclosure is not limited to the deep neural network.

For example, the artificial neural network model can be a model such as ViT, DaViT, Mobile ViT, Swin-Transformer, Transformer, YOLO (You Only Look Once), CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the artificial neural network model 110a may be an ensemble model based on at least two different models.

Hereinafter, an inference process by the exemplary artificial neural network model 110a will be described.

The artificial neural network model 110a may be an exemplary deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited only to the artificial neural network model illustrated in FIG. 1. The first hidden layer 110a-3 and the second hidden layer 110a-5 may also be referred to as a plurality of hidden layers.

The input layer 110a-1 may exemplarily include input nodes x1 and x2. That is, the input layer 110a-1 may include information about two input values.

For example, the first connection network 110a-2 may include information about six weight values for connecting nodes of the input layer 110a-1 to nodes of the first hidden layer 110a-3, respectively. Each weight value is multiplied with the input node value, and an accumulated value of the multiplied values is stored in the first hidden layer 110a-3. Here, the nodes and weights may be referred to as parameters.

For example, the first hidden layer 110a-3 may include nodes a1, a2, and a3. That is, the first hidden layer 110a-3 may include information about three node values.

The first processing element PE1 of FIG. 1 may perform the MAC operation of the a1 node.

The second processing element PE2 of FIG. 1 may perform the MAC operation of the a2 node.

The third processing element PE3 of FIG. 1 may perform the MAC operation of the a3 node.

For example, the second connection network 110a-4 may include information about nine weight values for connecting nodes of the first hidden layer 110a-3 to nodes of the second hidden layer 110a-5, respectively. The weight value of the second connection network 110a-4 is multiplied with the node value input from the corresponding first hidden layer 110a-3 and the accumulated value of the multiplied values is stored in the second hidden layer 110a-5.

For example, the second hidden layer 110a-5 may include nodes b1, b2, and b3. That is, the second hidden layer 110a-5 may include information about three node values.

The fourth processing element PE4 of FIG. 1 may process the operation of the b1 node.

The fifth processing element PE5 of FIG. 1 may process the operation of node b2.

The sixth processing element PE6 of FIG. 1 may process the operation of node b3.

For example, the third connection network 110a-6 may include information about six weight values which connect nodes of the second hidden layer 110a-5 and nodes of the output layer 110a-7, respectively. The weight value of the third connection network 110a-6 is multiplied with the node value input from the second hidden layer 110a-5, and the accumulated value of the multiplied values is stored in the output layer 110a-7.

For example, the output layer 110a-7 may include nodes y1 and y2. That is, the output layer 110a-7 may include information about two node values.

The seventh processing element PE7 of FIG. 1 may process the operation of node y1.

The eighth processing element PE8 of FIG. 1 may process the operation of node y2.

Each node may correspond to a feature value, and the feature value may correspond to a feature map.

Figure 2A:
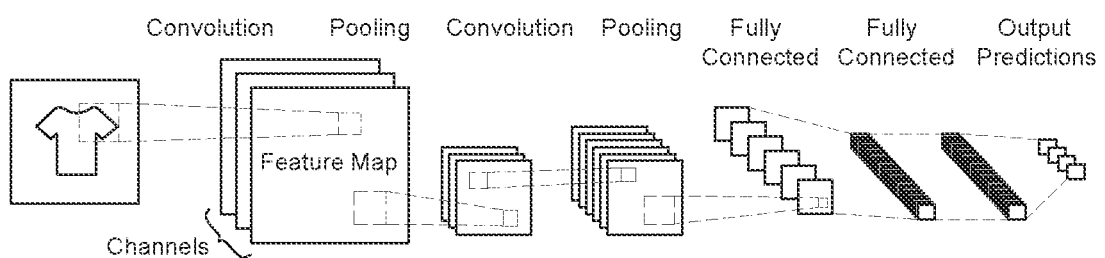
FIG. 2A is a diagram for explaining the basic structure of a convolutional neural network (CNN).

FIG. 2A is a diagram for explaining the basic structure of a convolutional neural network (CNN).

Referring to FIG. 2A, an input image may be displayed as a two-dimensional matrix composed of rows of a specific size and columns of a specific size. An input image may have a plurality of channels, where the channels may represent the number of color components of the input data image.

The convolution process means performing a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 2B:
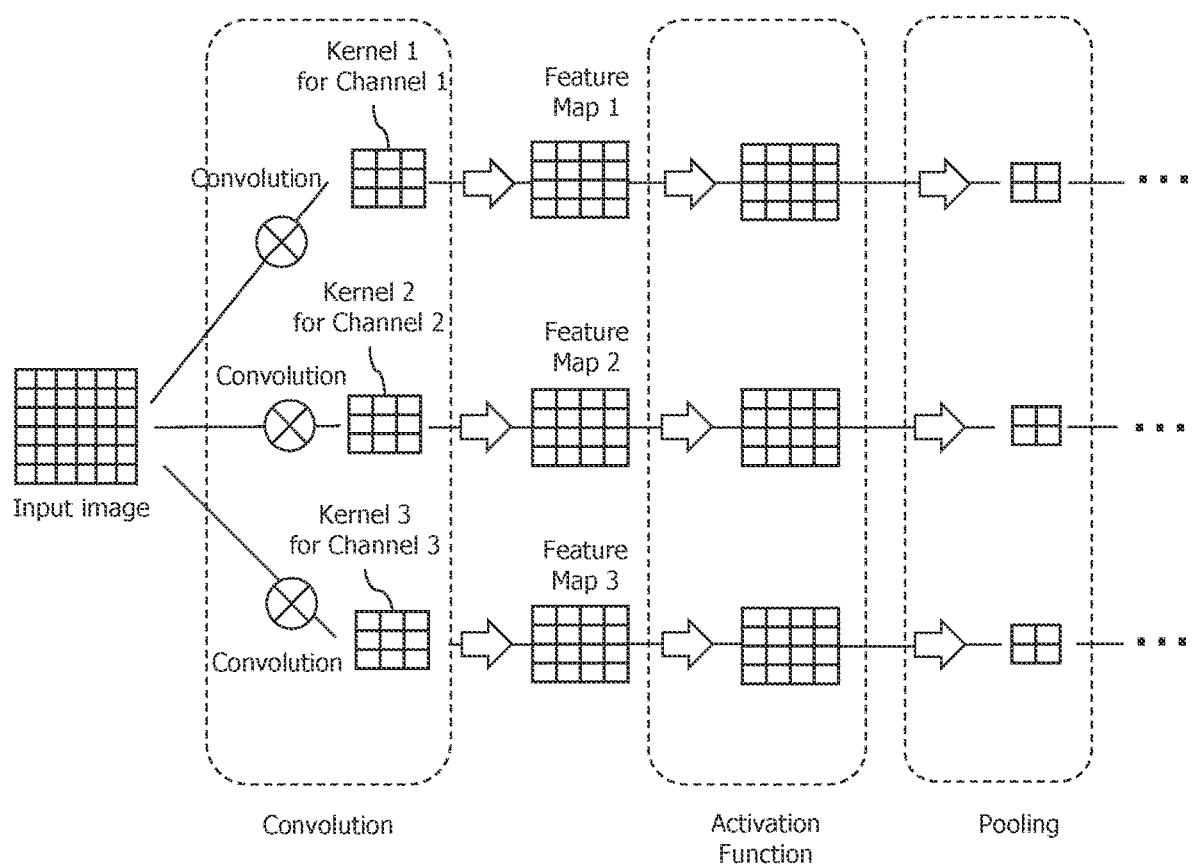
FIG. 2B is a comprehensive diagram showing the operation of a convolutional neural network.

FIG. 2B is a comprehensive diagram showing the operation of a convolutional neural network.

Referring to FIG. 2B, an input image is exemplarily represented as a two-dimensional matrix having a size of 6×6. In addition, FIG. 2B exemplarily illustrates three nodes, channel 1, channel 2, and channel 3.

First, the convolution operation will be described.

The input image (shown as an example of size 6×6 in FIG. 2B) is convolved with a kernel 1 (shown as an example of size 3×3 in FIG. 2B) for channel 1 at the first node, resulting in the output feature map 1 (shown as an example of size 4×4 in FIG. 2B). Similarly, the input image (shown as an example of size 6×6 in FIG. 2B) is convolved with a kernel 2 (shown as an example of size 3×3 in FIG. 2B) for channel 2 at the second node, resulting in the output feature map 2 (shown as an example of size 4×4 in FIG. 2B). Additionally, the input image is convolved with a kernel 3 (shown as an example of size 3×3 in FIG. 2B) for channel 3 at the third node, resulting in the output feature map 3 (shown as an example of size 4×4 in FIG. 2B).

To process each convolution, the processing elements PE1 to PE12 of the neural processing unit 100 are configured to perform a MAC operation.

Next, the operation of the activation function will be described.

The feature map 1, the feature map 2, and the feature map 3 (which are represented as 4×4 examples in FIG. 2B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 2B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, and average pooling can be used to find the average within a specific region.

In the example of FIG. 2B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

The aforementioned convolution, activation function, and pooling are repeated, and finally, it can be output as fully connected. The corresponding output may be input again to an artificial neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

<Required Hardware Resources for ANN>

Figure 3:
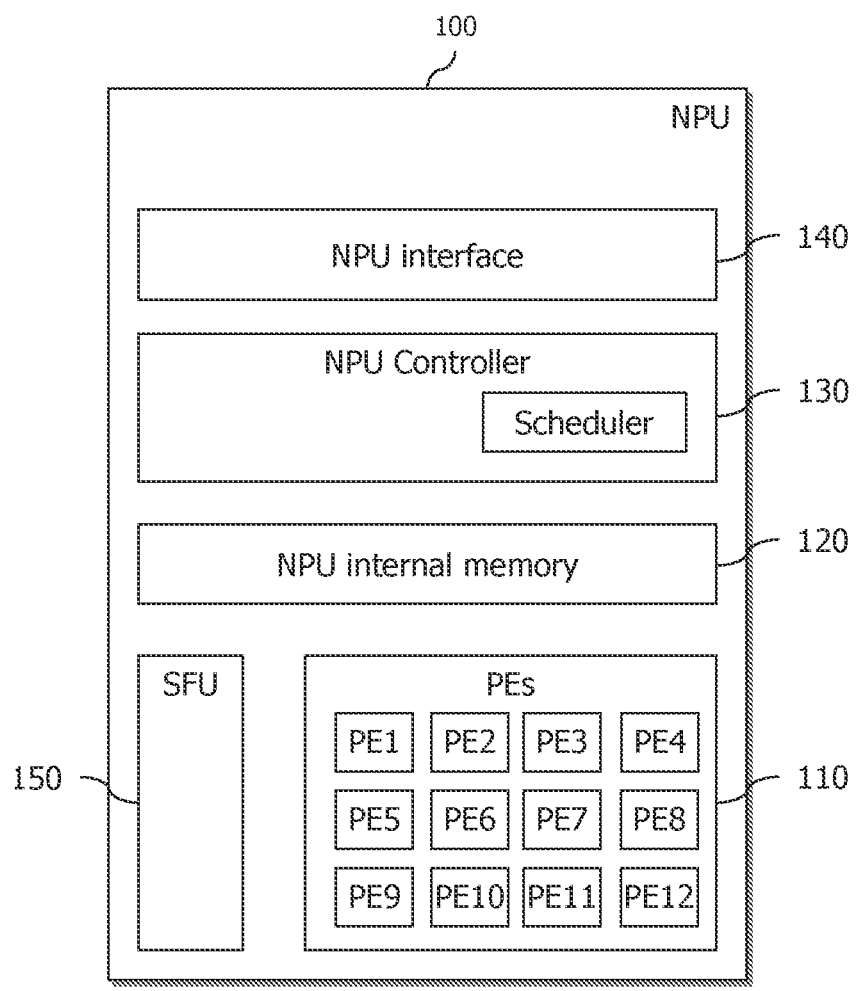
FIG. 3 is a schematic conceptual diagram illustrating a neural processing unit according to an example of the present disclosure.

FIG. 3 is a schematic conceptual diagram illustrating a neural processing unit according to the present disclosure.

Referring to FIG. 3, a neural processing unit (NPU) 100 is a processor specialized to perform an operation for an artificial neural network.

The artificial neural network refers to a network that consists of artificial neurons which, when receiving various inputs or entry stimulations, multiply a weight by the inputs or stimulations, add the multiplied values, and convert a value obtained by additionally adding a deviation using an active function to transmit. The artificial neural network trained as described above may be used to output an inference result from input data.

The neural processing unit 100 may be a semiconductor device implemented by an electric/electronic circuit. The electric/electronic circuit may refer to a circuit including a large number of electronic elements (transistors, capacitors, and the like).

In the case of a transformer and/or CNN-based artificial neural network model, the neural processing unit 100 may select and process matrix multiplication operations, convolution operations, and the like according to the architecture of the artificial neural network.

For example, in each layer of a convolutional neural network (CNN), an input feature map corresponding to input data and a kernel corresponding to weights may be a tensor or matrix composed of a plurality of channels. A convolution operation between the input feature map and the kernel is performed, and a convolution operation and a pooled output feature map are generated in each channel. An activation map of a corresponding channel is generated by applying an activation function to the output feature map. After that, pooling for the activation map may be applied. Here, the activation map may be collectively referred to as an output feature map. For convenience of explanation, the activation map may be referred to as an output feature map.

However, examples of the present disclosure are not limited thereto, and the output feature map means that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for processing additional algorithms. That is, some circuit units of the SFU 150 to be described later may be configured to be included in the plurality of processing elements 110.

The neural processing unit 100 may be configured to include a plurality of processing elements 110 for processing convolution and matrix multiplication necessary for the above-described artificial neural network operation.

The neural processing unit 100 may be configured to include each processing circuit optimized for matrix-multiplication operation, convolution operation, activation function operation, pooling operation, stride operation, batch-normalization operation, skip-connection operation, concatenation operation, quantization operation, clipping operation, padding operation, and the like required for the above-described artificial neural network operation.

For example, the neural processing unit 100 may be configured to include the SFU 150 for processing at least one of activation function operation, pooling operation, stride operation, batch-normalization operation, skip-connection operation, concatenation operation, quantization operation, clipping operation, and padding operation for the above-described algorithms.

The neural processing unit 100 may include a plurality of processing elements (PE) 110, an NPU internal memory 120, an NPU controller 130, and an NPU interface 140. Each of the plurality of processing elements 110, the NPU internal memory 120, the NPU controller 130, and the NPU interface 140 may be a semiconductor circuit to which a large number of the electronic elements are connected. Therefore, some of electronic elements may be difficult to identify or be distinguished with the naked eye, but may be identified only by a circuitry operation.

For example, an arbitrary circuit may operate as a plurality of the processing elements 110, or may operate as an NPU controller 130. The NPU controller 130 may be configured to perform the function of the control unit that is configured to control the artificial neural network inference operation of the neural processing unit 100.

The neural processing unit 100 may include a NPU controller 130 including an NPU internal memory 120 configured to store parameters of an artificial neural network model that can be inferred from the plurality of processing elements 110 and the SFU 150 and a scheduler configured to control operation schedules of the plurality of processing elements 110, the SFU 150, and the NPU internal memory 120.

The neural processing unit 100 may be configured to process the feature map corresponding to the encoding and decoding method using scalable video coding (SVC) or scalable feature-map coding (SFC). The above schemes are technologies that variably vary the data transmission rate according to the effective bandwidth and signal to noise ratio (SNR) of a communication channel or communication bus. That is, the neural processing unit 100 may be configured to further include an encoder and a decoder.

The plurality of processing elements 110 may perform a portion of the operations for an artificial neural network.

SFU 150 may perform another portion of the operation for the artificial neural network.

The neural processing unit 100 may be configured to hardware-accelerate the computation of the artificial neural network model using the plurality of processing elements 110 and the SFU 150.

The NPU interface 140 may communicate with various components connected to the neural processing unit 100, for example, memories, via a system bus.

The NPU controller 130 may include a scheduler configured to control the operation of multiple processing elements 110 for inference operations of a neural processing unit 100, as well as operations of the SFU 150 and reading and writing order of the internal memory 120 of the NPU.

The scheduler in the NPU controller 130 may be configured to control the plurality of processing elements 110, the SFU 150, and the NPU internal memory 120 based on data locality information or structure information of the artificial neural network model.

The schedular in the NPU controller 130 may analyze or receive analyzed information on a structure of an artificial neural network model which may operate in the plurality of processing elements 110. The analyzed information may be information generated by a compiler. For example, data of the artificial neural network, which may be included in the artificial neural network model may include node data (i.e., feature map) of each layer, data on a layout of layers, locality information of layers or information about the structure, and at least a portion of weight data (i.e., weight kernel) of each of connection networks connecting the nodes of the layers. The data of the artificial neural network may be stored in a memory provided in the NPU controller 130 or the NPU internal memory 120. However, it is not limited thereto, and the data of the artificial neural network may be stored in a separate cache memory or register file provided in the NPU or SoC including the NPU.

The scheduler in the NPU controller 130 may receive scheduling information of an operation sequence of the artificial neural network model to be performed by the neural processing unit 100 based on data locality information or structure information of the compiled artificial neural network model. For example, the scheduling information may be information generated by a compiler. Scheduling information generated by the compiler may be referred to as machine code or binary code.

That is, the scheduling information utilized by the NPU controller 130 may be information generated by a compiler based on data locality information or structure of an artificial neural network model.

In other words, the compiler can efficiently schedule NPUs depending on how well the compiler understands and reconstructs the locality of artificial neural network data, which is a unique characteristic of artificial neural network models.

In other words, the compiler can efficiently schedule the NPU according to how well the compiler understands the hardware structure and performance of the neural processing unit 100.

In other words, when the artificial neural network model is compiled to be executed in the neural processing unit 100 by the compiler, the artificial neural network data locality may be reconstructed. The artificial neural network data locality can be reconstructed according to the algorithms applied to the artificial neural network model and the operating characteristics of the processor.

To elaborate, the artificial neural network data locality can be reconstructed according to a method in which the neural processing unit 100 processes the corresponding artificial neural network model, for example, feature map tiling or a stationary method of processing elements.

To elaborate, artificial neural network data locality can be reconstructed according to the number of processing elements of the neural processing unit 100 and the capacity of the internal memory.

To elaborate, the artificial neural network data locality can be reconstructed according to the bandwidth of the memory communicating with the neural processing unit 100.

This is because the neural processing unit 100 may differently determine the order of necessary data at each moment in each clock cycle even though the same artificial neural network model is operated and processed by each of the factors described above.

Based on the order of data required for the operation of the artificial neural network model, the compiler may determine data locality and generate compiled machine code based on the order of operation of the layers, convolutions and/or matrix multiplications of the artificial neural network.

The scheduler may be configured to utilize scheduling information contained in machine code. The scheduler in the NPU controller 130 may obtain a memory address value in which the feature map and weight data of the layer of the artificial neural network model are stored based on the scheduling information.

For example, the scheduler in the NPU controller 130 may acquire the memory address value of the feature map of the layer of the artificial neural network model and the weight data which are stored in the memory. Accordingly, the scheduler in the NPU controller 130 may acquire feature map of a layer and weight data of an artificial neural network model to be driven from the main memory, to store the acquired data in the NPU internal memory 120.

Feature map of each layer may have a corresponding memory address value.

Each of the weight data may have a corresponding memory address value.

The scheduler in the NPU controller 130 may schedule an operation order of the plurality of processing elements 110 based on the data locality information or the information about the structure of the artificial neural network model, for example, the layout information of layers of the artificial neural network or the information about the structure of the artificial neural network model.

The scheduler in the NPU controller 130 may schedule based on the data locality information or the information about the structure of the artificial neural network model so that the NPU scheduler may operate in a different way from a scheduling concept of a normal CPU. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing.

In contrast, the scheduler in the NPU controller 130 may control the neural processing unit 100 according to a determined processing order of the neural processing unit 100 based on the data locality information or the information about the structure of the artificial neural network model.

Moreover, the scheduler in the NPU controller 130 may operate the neural processing unit 100 according to the determined the processing order based on the data locality information or the information about the structure of the artificial neural network model and/or data locality information or information about a structure of the neural processing unit 100 to be used.

However, the present disclosure is not limited to the data locality information or the information about the structure of the neural processing unit 100.

The scheduler in the NPU controller 130 may be configured to store the data locality information or the information about the structure of the artificial neural network.

That is, even though only the data locality information or the information about the structure of the artificial neural network of the artificial neural network model is utilized, the scheduler in the NPU controller 130 may determine a processing sequence.

Moreover, the scheduler in NPU controller 130 may determine the processing order of the neural processing unit 100 by considering the data locality information or the information about the structure of the artificial neural network model and data locality information or information about a structure of the neural processing unit 100. Furthermore, it is possible to optimize the processing according to the determined processing order.

That is, the NPU controller 130 may be configured to operate based on machine code compiled by a compiler, but in another example, the NPU controller 130 may be configured to embed an embedded compiler. According to the above-described configuration, the neural processing unit 100 may be configured to receive a file in the form of a framework of various AI software and generate machine code. For example, AI software frameworks may include TensorFlow, PyTorch, Keras, XGBoost, mxnet, DARKNET, ONNX, and the like.

The plurality of processing elements 110 refers to a configuration in which a plurality of processing elements PE1 to PE12 that is configured to operate feature map and weight data of the artificial neural network is deployed. Each processing element may include a multiply and accumulate (MAC) operator and/or an arithmetic logic unit (ALU) operator, but the examples according to the present disclosure are not limited thereto.

Each processing element may further include an additional special function unit for processing the additional special functions.

For example, it is also possible for the processing element PE to be modified and implemented to further include a batch-normalization unit, an activation function unit, an interpolation unit, and the like.

The SFU 150 may include each processing circuit configured to select and process activation function operation, pooling operation, stride operation, batch-normalization operation, skip-connection operation, concatenation operation, quantization operation, clipping operation, padding operation, and the like according to the architecture of the artificial neural network. That is, the SFU 150 may include a plurality of special function arithmetic processing circuit units.

Even though FIG. 3 illustrates a plurality of processing elements as an example, operators implemented by a plurality of multiplier and adder trees may also be configured to be deployed in parallel in one processing element, instead of the MAC. In this case, the plurality of processing elements 110 may also be referred to as at least one processing element including a plurality of operators.

Figure 5:
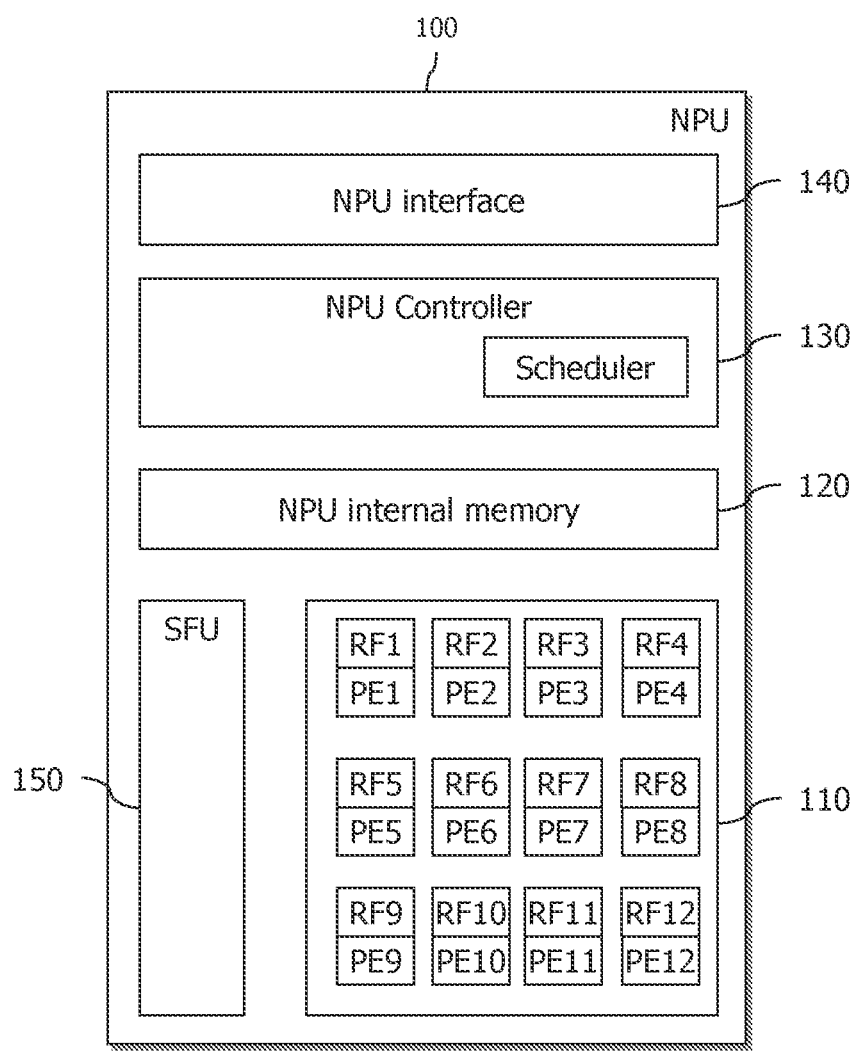
FIG. 5 is an exemplary diagram illustrating a modified example of the neural processing unit 100 shown in FIG. 3.

The plurality of processing elements 110 is configured to include a plurality of processing elements PE1 to PE12. The plurality of processing elements PE1 to PE12 of FIG. 5 is merely an example for the convenience of description and the number of the plurality of processing elements PE1 to PE12 is not limited to 12 or any other integer numbers. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A number of the plurality of processing elements 110 may be designed in consideration of the characteristic of the artificial neural network model in which the neural processing unit 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 4A:
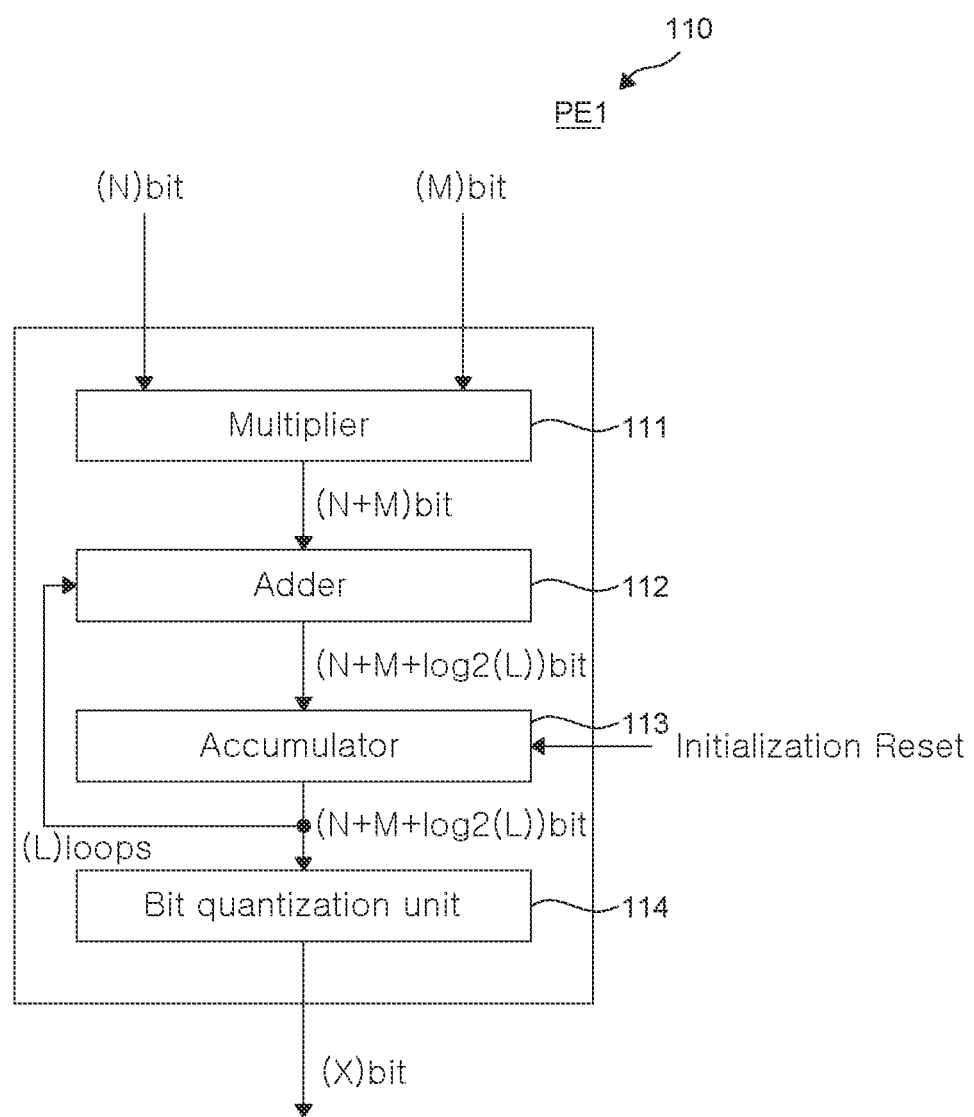
FIG. 4A is a schematic conceptual diagram illustrating one processing element among a plurality of processing elements that may be applied to an example of the present disclosure.

FIG. 4A illustrates one processing element among a plurality of processing elements that may be applied to the present disclosure.

As illustrated in FIG. 3, the neural processing unit 100 according to the examples of the present disclosure may include the plurality of processing elements 110, the NPU internal memory 120 configured to store an artificial neural network model inferred from the plurality of processing elements 110, and the NPU controller 130 configured to control the plurality of processing elements 110 and the NPU internal memory 120 based on data locality information or information about a structure of the artificial neural network model. The plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

As illustrated in FIG. 4A, the first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristic of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+log 2 (L)) bits. Here, L is an integer greater than zero.

When the accumulation is completed, the accumulator 113 is applied with an initialization reset to initialize the data stored in the accumulator 113 to zero, but the examples according to the present disclosure are not limited thereto.

The bit quantizer 114 may reduce the bit width of the data output from the accumulator 113. The bit quantizer 114 may be controlled by the NPU controller 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption. Further, when the power consumption is reduced, the heat generation may also be reduced. Additionally, when the heat generation is reduced, the possibility of the erroneous operation of the neural processing unit 100 due to the high temperature may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU controller 130 may also be configured to extract quantized information by analyzing the artificial neural network model. Accordingly, the output data (X) bit is converted to a quantized bit width to be output so as to correspond to the quantized data size. The output data (X) bit of the bit quantizer 114 may be stored in the NPU internal memory 120 with a quantized bit width.

The plurality of processing elements 110 of the neural processing unit 100 according to an example of the present disclosure may include a multiplier 111, an adder 112, and an accumulator 113. The bit quantizer 114 may be selected according to whether quantization is applied or not. In another example, the bit quantization unit may also be configured to be included in the SFU 150.

Figure 4B:
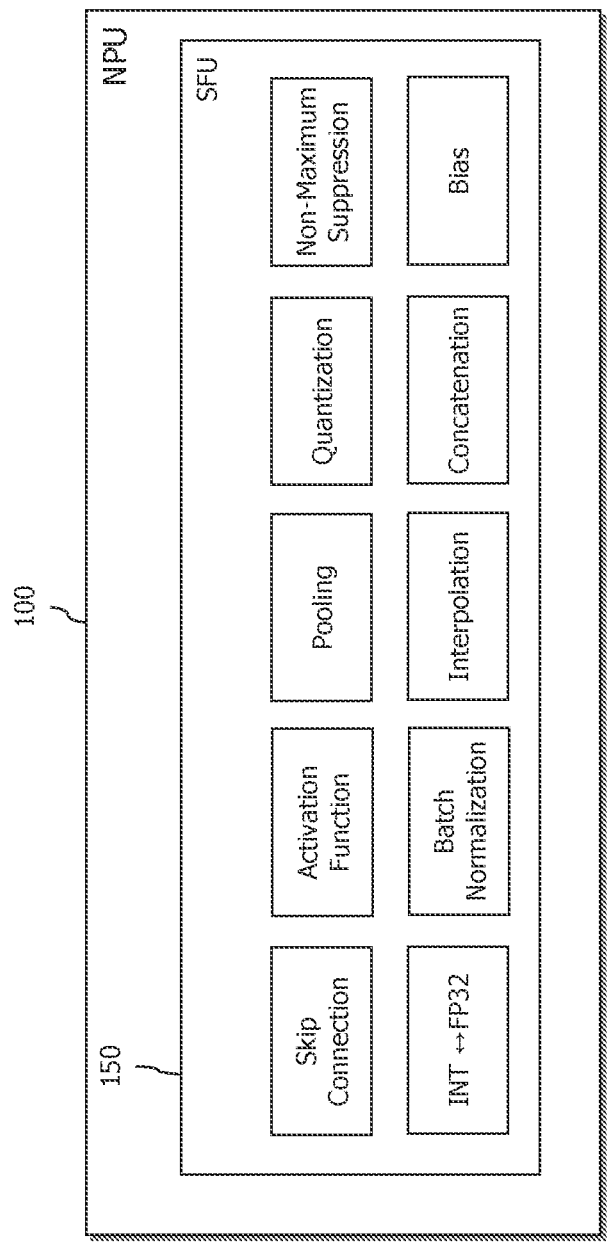
FIG. 4B is a schematic conceptual diagram illustrating an SFU that can be applied to an example of the present disclosure.

FIG. 4B is a schematic conceptual diagram illustrating an SFU that can be applied to the present disclosure.

Referring to FIG. 4B, the SFU 150 may include several functional units. Each functional unit can be operated selectively. Each functional unit can be selectively turned on or turned off. That is, each functional unit can be set.

In other words, the SFU 150 may include various circuit units required for an artificial neural network inference operation.

For example, the circuit units of the SFU 150 may include a functional unit for skip-connection operation, a functional unit for activation function operation, a functional unit for pooling operation, a functional unit for quantization operation, a functional unit for non-maximum suppression (NMS) operation, a functional unit for integer to floating point conversion (INT to FP32) operation, a functional unit for a batch-normalization operation, a functional unit for an interpolation operation, a functional unit for a concatenation operation, a functional unit for a bias operation, and the like.

Functional units of the SFU 150 may be selectively turned on or off according to the data locality information of the artificial neural network model. Data locality information of an artificial neural network model may include turn-off of a corresponding functional unit or control information related to turn-off when an operation for a specific layer is performed.

An activated unit among functional units of the SFU 150 may be turned on. In this way, when some functional units of the SFU 150 are selectively turned off, power consumption of the neural processing unit 100 can be reduced. Meanwhile, in order to turn off some functional units, power gating may be used. Alternatively, clock gating may be performed to turn off some functional units.

FIG. 5 illustrates a modified example of the neural processing unit 100 of FIG. 3.

The neural processing unit 100 of FIG. 5 is substantially the same as the neural processing unit 100 exemplarily illustrated in FIG. 3, except for the shown addition of the plurality of processing elements 110. Thus, redundant description will be omitted for the brevity.

The plurality of processing elements 110 exemplarily illustrated in FIG. 5 may further include register files RF1 to RF12, each of which corresponds to processing elements PE1 to PE12 respectively, in addition to a plurality of processing elements PE1 to PE12.

The plurality of processing elements PE1 to PE12 and the plurality of register files RF1 to RF12 of FIG. 5 are merely an example for the convenience of description and the number of the plurality of processing elements PE1 to PE12 and the plurality of register files RF1 to RF12 is not limited to 12 or any other integer number.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the artificial neural network model in which the neural processing unit 100 operates. For additional explanation, the memory size of the register file may be determined in consideration of a data size, a required operating speed, and a required power consumption of the artificial neural network model to operate.

The register files RF1 to RF12 of the neural processing unit 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

<Technical Difficulties Found by the Inventors of the Present Disclosure>

Depending on the purpose of the artificial intelligence service, several types of artificial neural network (ANN) models may exist. For example, when input data is an image or video, a CNN type artificial neural network model for object classification, object detection, object tracking, and the like in an image/video may be used for artificial intelligence service.

In general, an artificial neural network model may have a different amount of computation for each layer. This will be described with reference to FIGS. 6A and 6B.

Figure 6A:
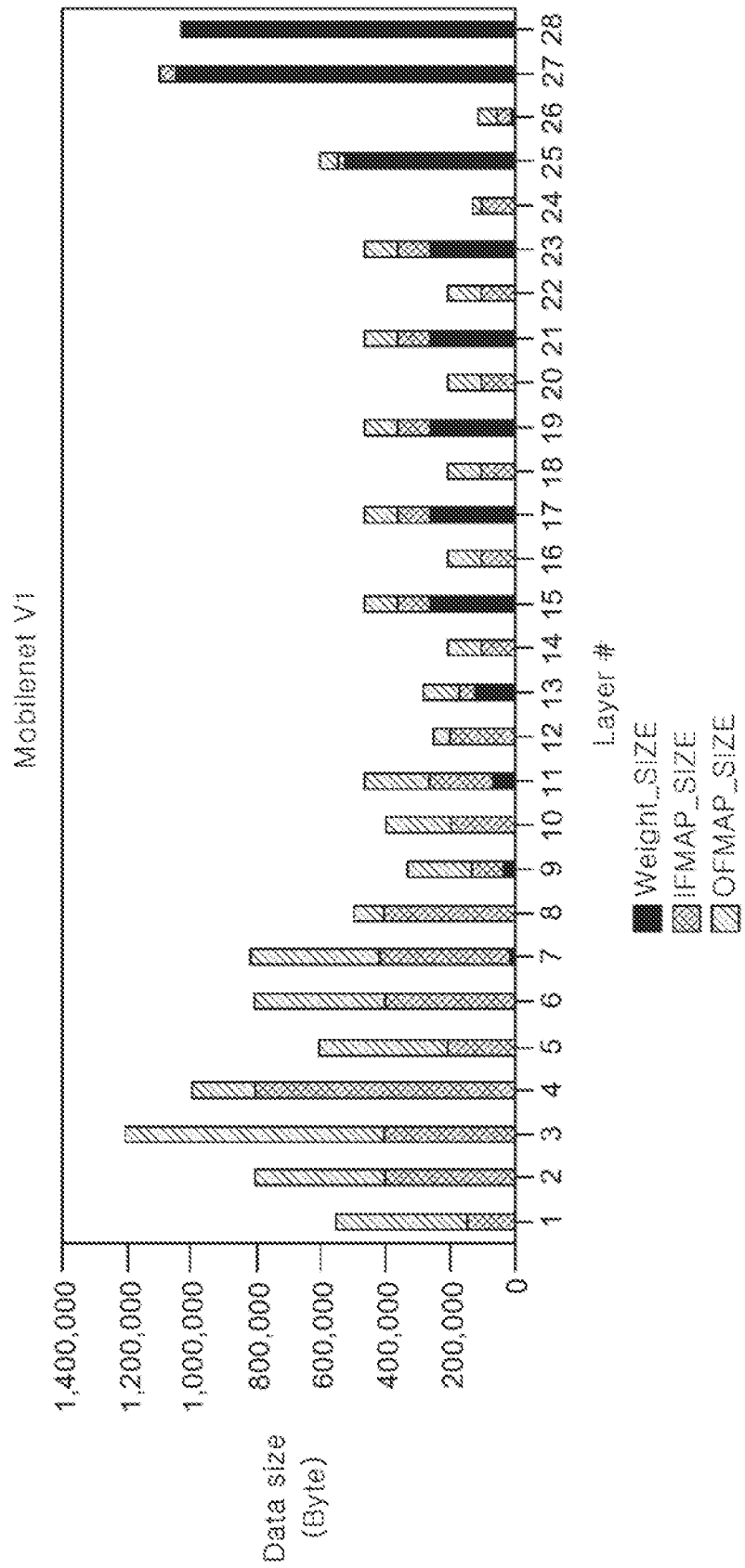
FIG. 6A is an exemplary view showing the size of data for each layer in the exemplary artificial neural network model.

FIG. 6A is an exemplary view showing the size of data for each layer in the exemplary artificial neural network model, and FIG. 6B is an exemplary table showing the size of data for each layer in the exemplary artificial neural network model shown in FIG. 6A.

The exemplary artificial neural network model shown in FIG. 6A is shown to be Mobilenet V1. The horizontal axis shown in FIG. 6A represents layers sequentially in the exemplary artificial neural network model, and the vertical axis represents the size of data.

Referring to layer 1 shown in FIG. 6A, it can be seen that the size of the output feature map OFMAP_SIZE is greater than the size of the input feature map IFMAP_SIZE.

The output feature map of the first layer is transferred to the second layer and becomes the input feature map of the second layer. When the calculation of the second layer is completed, an output feature map is output. The output feature map of the second layer is transferred to the third layer again, and becomes the input feature map of the third layer.

As such, the size of input data input to each layer and the size of an output feature map output from each layer may be different. Accordingly, the amount of calculation may be small in a certain layer, but the amount of calculation may be very large in another layer. In this way, as the amount of computation per layer is greatly fluctuated, a problem of managing power stability may occur.

The amount of computation of each layer can be known by MAC. It can be seen that the amount of computation for each layer differs by a maximum of 227 times.

The neural network processing unit 100 may determine the number of operating processing elements among the plurality of processing elements 110 in proportion to the MAC operation amount for each layer. In addition, power consumption may increase in proportion to the number of operating processing elements.

In addition, as the difference in MAC computation amount between adjacent layers increases, the deviation of peak power between adjacent layers may increase. Also, the larger the deviation of the peak power, the more the supply voltage VDD (e.g., a driving voltage) may fluctuate.

In particular, the inventors of the present disclosure have recognized that when the amount of calculations greatly increases in a specific layer, peak power consumption increases, thereby deteriorating system stability.

For example, many processing elements may be operated at the same time for the operation of a specific layer. A certain amount of power is required to drive each processing element, and when a considerable number of processing elements are simultaneously driven, the required power may rapidly increase. If the neural processing unit is designed specifically for low-power operation, the power supply capability may be relatively less than that of the neural processing unit for a server. Accordingly, such a neural processing unit for an edge device may be relatively more vulnerable to an instantaneous power supply issue, and a supply voltage VDD may fluctuate when the power supply amount increases exponentially. Thus, data stored in the transistor may be lost, especially if the supply voltage VDD drops below the threshold voltage of the transistor. In other words, when the supply voltage VDD is lowered, setup/hold violation problems may occur in the neural processing unit, resulting in malfunction.

For another example, the inventors of the present disclosure have recognized that since the plurality of PEs 110 that perform operations for an artificial neural network, for example, add, multiply, and accumulate instantaneously consume a lot of power, sufficient power may not be supplied to other components in the NPU, for example, the internal memory 120. Specifically, the inventors of the present disclosure have recognized that there may be a problem that cannot be ruled out that, if sufficient power is not supplied to the internal memory 120, the possibility of compromising stored data bits may occur.

Disclosures of the Present Disclosure

The inventors of the present disclosure have recognized that the above-mentioned problem may be occurred due to a clock signal supplied to a hardware for performing calculations of the artificial neural network model.

Thus, the inventors of the present disclosure invented a technique for lowering peak power by dividing the plurality of PEs in the NPU into PEs of a first group and PEs of a second group and operating them according to different clock signals.

The examples in which the techniques disclosed by the inventors of the present disclosure will be described with reference to the drawings.

Figure 7A:
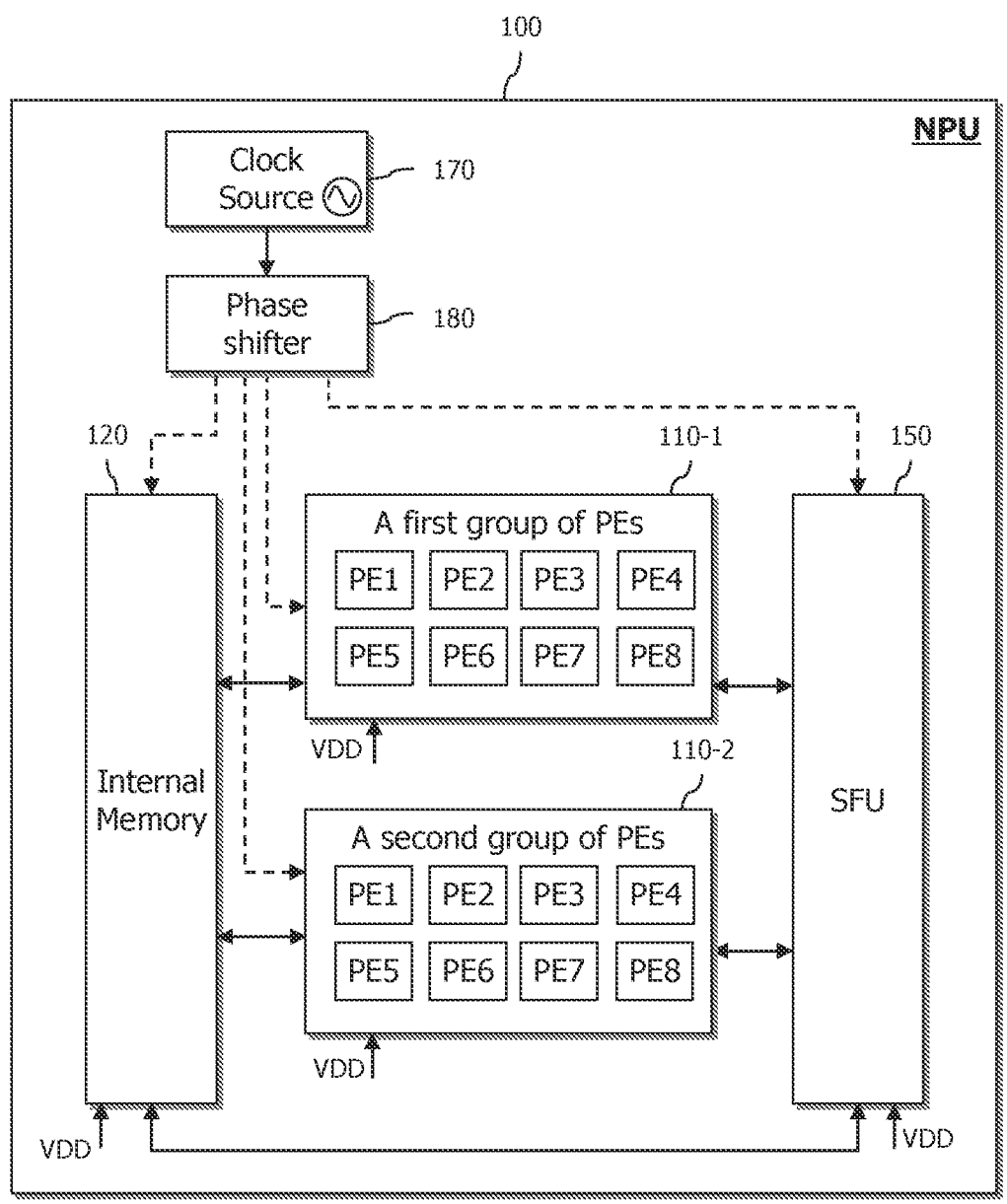
FIG. 7A is an exemplary diagram showing the structure of an NPU according to an example of the present disclosure.

FIG. 7A is an exemplary diagram showing the structure of an NPU according to an example of the present disclosure.

FIG. 7A illustrates that the neural processing unit 100 may include a first group of PEs 110-1, a second group of PEs 110-2, an internal memory 120, an SFU 150, a clock source 170 and a phase shifter 180. However, the neural processing unit 100 may further include an NPU controller 130 and an NPU interface 140 as shown in FIG. 3 or 5.

Each of the PEs 110-1 of the first group, the PEs 110b of the second group, the internal memory 120, the NPU controller 130, the NPU interface 140, the SFU 150, the clock source 170, and the phase shifter 180 may be a semiconductor circuit to which numerous transistors are connected. Accordingly, some of them may be difficult to discern and distinguish with the naked eye, and may only be identified by its functions. The clock source 170 may be referred to as a clock signal generating circuit.

For example, an arbitrary circuit may operate as a plurality of processing elements (PEs) 110 or as an NPU controller 130.

The first group of PEs 110-1 and the second group of PEs 110-2 shown in FIG. 7A should be understood as being divided into a plurality of PEs 110 shown in FIG. 3 or 5. Although the number of PEs belonging to each group is illustrated as eight groups as an example in FIG. 7A, and it will be apparent that the number of PEs belonging to each group may vary. In addition, the number of PEs allocated to each group can be changed semi-fixedly or dynamically. For example, a first group of PEs 110-1 may include ten of PEs, and a second group of PEs 110-2 may include six of PEs. This change may be performed under the control of the NPU controller 130.

It is also possible that each PE group is referred to as an NPU core, an NPU engine, an NPU thread, or the like.

The clock source 170 shown in FIG. 7A may include an oscillator. Also, the oscillator may include a pulse width modulator (PWM). The PWM may adjust the duty ratio of the high signal and the low signal by changing the duty cycle of the clock cycle.

When the clock source 170 generates and outputs the original clock signal, the phase shifter 180 may bypass and output the original clock signal, or delay or shift the phase of the original clock signal and output the original clock signal.

For example, the phase shifter 180 may bypass the original clock signal generated by the clock source 170 to the PEs 110-1 of the first group. Alternatively, the phase shifter 180 may transfer a first delayed clock signal obtained by delaying or shifting the phase of the original clock signal generated by the clock source 170 to the first group of PEs 110-1. In addition, the phase shifter 180 may transfer a second delayed clock signal obtained by delaying or shifting the phase of the original clock signal generated by the clock source 170 to the second group of PEs 110-2.

As described above, according to an example of the present disclosure, as shown in FIG. 7A, dividing the plurality of PEs 110 shown in FIG. 3 or 5 into a first group of PEs 110-1 and a second group of PEs 110-2, and operating the first group of PEs 110-1 and the second group of PEs 110-2 according to different clock signals, thereby reducing the peak power.

In addition, according to an example of the present disclosure, providing a phase shifter 180 and a clock source 170 without equipping a plurality of clock sources so as to provide a plurality of clock signals having different phases, thereby reducing the manufacturing cost.

Figure 7B:
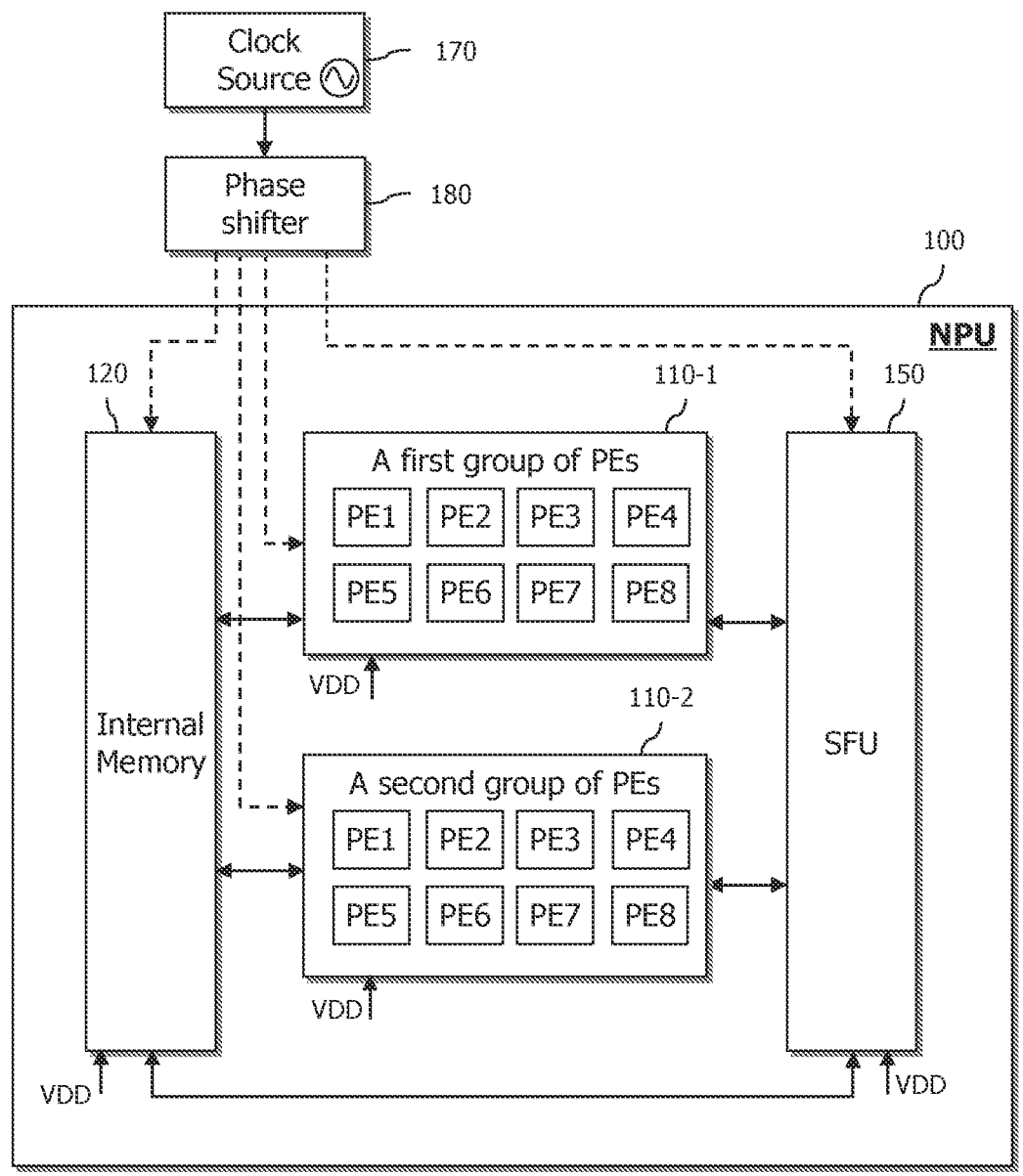
FIG. 7B is an exemplary view showing the structure of an NPU according to another example of the present disclosure.

FIG. 7B is an exemplary view showing the structure of an NPU according to an example of the present disclosure.

In FIG. 7B, the neural processing unit 100 is illustrated as including a first group of PEs 110-1, a second group of PEs 110-2, an internal memory 120, and an SFU 150. In addition, the neural processing unit 100 may further include an NPU controller 130 and an NPU interface 140 as shown in FIG. 3 or 5.

Each of the first group of PEs 110-1, the second group of PEs 110-2, the internal memory 120, the NPU controller 130, the NPU interface 140, and the SFUs 150 may be a semiconductor circuit in which numerous transistors are connected. Accordingly, some of them may be difficult to discern and distinguish with the naked eye, and may only be identified by operation thereof.

Referring to FIG. 7B, the clock source 170 and the phase shifter 180 are shown to be located outside the neural processing unit 100. Other than that, since it is the same as that shown in FIG. 7A, FIG. 7B will not be separately described, and the contents described with reference to FIG. 7A will be used as they are.

Meanwhile, the internal memory 120 and the SFU 150 shown in FIGS. 7A and 7B also operate according to a clock signal (e.g., an original clock signal or a phase delayed clock signal) output from the phase shifter 180.

On the other hand, when the first group of PEs 110-1 and the second group of PEs 110-2, shown in FIGS. 7A and 7B, complete the operation of an arbitrary layer of the artificial neural network model, the first group of PEs 110-1 and the second group of PEs 110-2 may respectively output an output feature map according to the clock signals respectively provided from the phase shifter 180. Specifically, the first group of PEs 110-1 may output a first output feature map according to an arbitrary clock signal (e.g., the original clock signal or the first delayed clock signal) provided from the phase shifter 180. Similarly, the second group of PEs 110-2 may output a second output feature map according to an arbitrary clock signal (e.g., a second delayed clock signal) provided from the phase shifter 180.

When the first output feature map output by the first group of PEs 110-1 and the second output feature map output by the second group of PEs 110-2 are independent from each other, the SFU 150 may first process an output feature map received first in a first input first output (FIFO) method.

Meanwhile, although not shown in FIGS. 7A and 7B, the SFU 150 may be directly connected to the NPU internal memory 120.

Referring to FIGS. 7A and 7B, a supply voltage VDD may be input to each circuit unit of the neural processing unit 100.

FIGS. 7A and 7B illustrate that a supply voltage VDD is described as an input voltage, but examples of the present disclosure are not limited thereto.

In some examples, it is also possible to provide a separate or independent supply voltage VDD to be input to each circuitry of the neural processing unit 100.

In some examples, it is also possible to provide a separate or independent supply voltage VDD to be input to several circuitries of the neural processing unit 100.

In some examples, it is also possible to provide a second supply voltage different from the first supply voltage to be input to a specific circuit unit of the neural processing unit 100.

On the other hand, although the NPU has been described in FIGS. 7A and 7B, the NPU may be implemented in a SoC form.

Figure 8A:
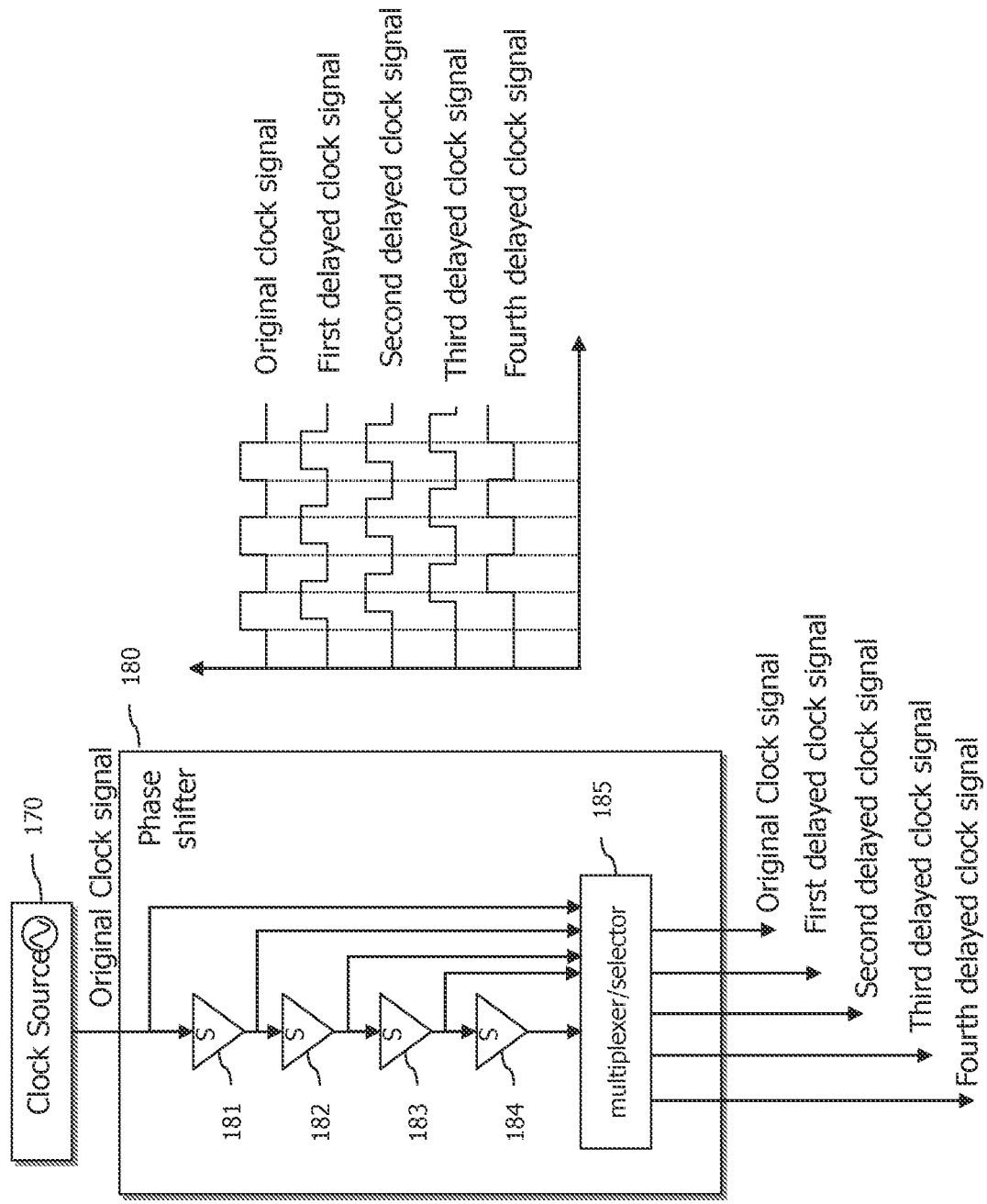
FIG. 8A is an exemplary diagram showing the phase shifter 180 shown in FIG. 7A or 7B in detail according to an example.

FIG. 8A is an exemplary diagram illustrating the phase shifter 180 shown in FIG. 7A or 7B in detail according to an example.

As shown in FIG. 8A, the phase shifter 180 may include a plurality of shifters S and a multiplexer/selector 185. In FIG. 8A, the number of shifters S is illustrated as four 181, 182, 183, and 184.

The original clock signal output from the clock signal 170 may be bypassed in the phase shifter 180 and output through the multiplexer/selector 185.

In addition, the original clock signal output from the clock signal 170 may be delayed once in phase through the first shifter 181 in the phase converter 180. Accordingly, the first delayed clock signal can be output through the multiplexer/selector 185.

In addition, the original clock signal output from the clock signal 170 may be delayed twice in phase through the first shifter 181 and the second shifter 182 in the phase converter 180. Accordingly, the second delayed clock signal can be output through the multiplexer/selector 185.

In addition, the original clock signal output from the clock signal 170 may be delayed three times in phase through the first shifter 181, the second shifter 182, and the third shifter 183 in the phase converter 180. Accordingly, the third delayed clock signal can be output through the multiplexer/selector 185.

In addition, the original clock signal output from the clock signal 170 may be delayed four times in phase through the first shifter 181, the second shifter 182, the third shifter 183, and the fourth shifter 184 in the phase converter 180. Accordingly, the fourth delayed clock signal can be output through the multiplexer/selector 185.

Figure 8B:
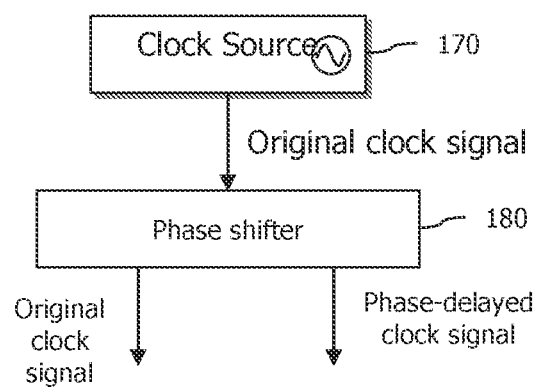
FIG. 8B is an exemplary diagram showing the phase shifter 180 shown in FIG. 7A or 7B in detail according to another example.

As illustrated in FIG. 8B, the multiplexer/selector 185 may multiplex a plurality of clock signals (i.e., the original clock signal, the first delayed clock signal, the second delayed clock signal, the third delayed clock signal, and the fourth delayed clock signal) and then selectively provide one clock signal to each group within the NPU.

To this end, the multiplexer/selector 185 may be connected to the output of the clock source 170 and the outputs of the plurality of shifters 181, 182, 183, and 184 so as to select at least one output from among the output of the clock source 170 and the outputs of the plurality of shifters 181, 182, 183, and 184.

For example, the multiplexer/selector 185 may provide the original clock signal to the internal memory 120, the first delayed clock signal to the first group of PEs 110-1, the second delayed clock signal to the second group of PEs 110-2, and the third delayed clock signal to the SFU 150. In this way, since each circuitry in the NPU is operated according to several clock signals out of phase with each other, sudden increase in peak power can be suppressed.

FIG. 8B is an exemplary diagram illustrating the phase shifter 180 shown in FIG. 7A or 7B in detail according to another example.

As illustrated in FIG. 8B, the phase shifter 180 may bypass the original clock signal provided from the clock source 170 and output while additionally outputting at least one clock signal obtained by delaying the original clock signal.

According to an example illustrated in FIG. 8B, the original clock signal may be provided to the first group of PEs 110-1, and the phase-delayed clock signal may be provided to the second group of PEs 110-2. In this way, peak power can be reduced by distributing the PEs 110-1 of the first group and the PEs 110-2 of the second group according to different clock signals.

Figure 9:
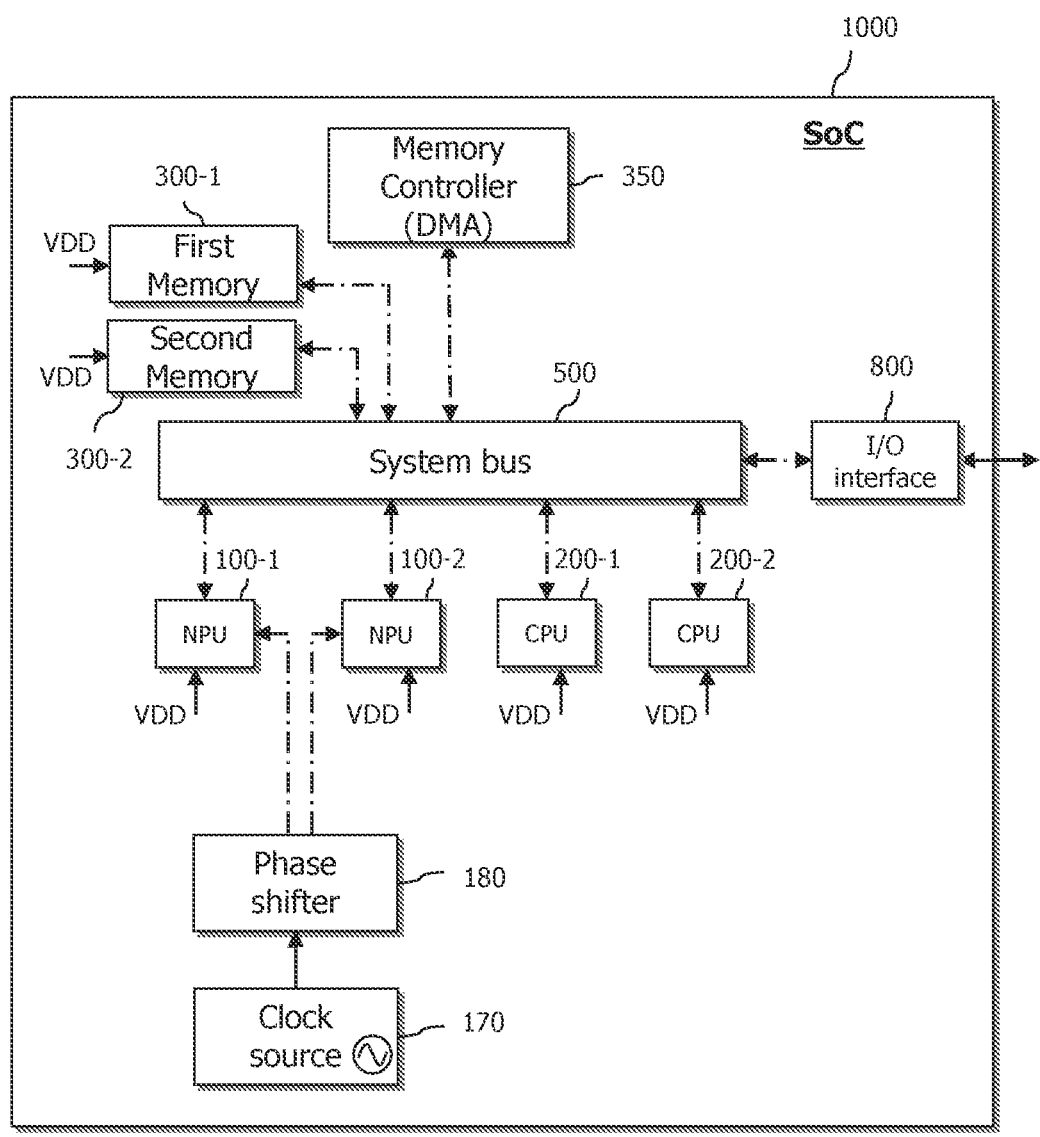
FIG. 9 is an exemplary diagram illustrating a structure of an SoC according to an example of the present disclosure.

FIG. 9 is an exemplary diagram illustrating a structure of an SoC according to an example of the present disclosure.

Referring to FIG. 9, an exemplary SoC 1000 may include a plurality of NPUs, a plurality of central processing units (CPUs), and a plurality of memories. The plurality of NPUs may include, for example, a first neural processing unit 100-1 and a second neural processing unit 100-2. Also, the plurality of CPUs may include, for example, a first CPU 200-1 and a second CPU 200-2. The plurality of memories may include a first memory 300-1 and a second memory 300-2.

Referring to FIGS. 7A and 7B, each of the plurality of NPUs (e.g., the first NPU 100-1 and the second NPU 100-2) may include a first group of PEs and a second group of PEs.

In FIG. 9, the number of the plurality of NPUs, the plurality of CPUs, and the plurality of memories is shown as two, respectively, but is not limited thereto, and the number may be variously modified such as four, six, eight, and the like.

The exemplary SoC 1000 may include a memory controller 350, a clock source 170, a phase shifter 180, a system bus 500, and an input output (I/O) interface 800.

The system bus 500 may be implemented by an electrically conductive pattern formed on a semiconductor die. The system bus enables high-speed communication. For example, the plurality of NPUs, the plurality of CPUs, the plurality of memories, and the memory controller 350 may communicate with each other through the system bus 500.

The clock source 170 and the phase shifter 180 shown in FIG. 9 may be identical to those shown in FIGS. 7A, 7B, 8A and 8B.

Accordingly, the phase shifter 180 may provide the original clock signal from the clock source 170 to a first group of PEs in the first NPU 100-1, and may provide a first phase delayed clock signal in which the phase of the original clock signal is delayed once to the second group of PEs in the first NPU 100-1. Alternatively, the phase shifter 180 may provide a first phase delayed clock signal obtained by delaying the phase of the original clock signal from the clock source 170 once to the first group of PEs in the first NPU 100-1, and may provide a second phase delayed clock signal in which the phase of the original clock signal is delayed twice may be provided to the second group of PEs in the first NPU 100-1.

Alternatively, the phase shifter 180 may provide the original clock signal from the clock source 170 to a first group of PEs in the second NPU 100-2, and may provide a first phase delayed clock signal in which the phase of the original clock signal is delayed once to the second group of PEs in the second NPU 100-2. Alternatively, the phase shifter 180 may provide a first phase delayed clock signal obtained by delaying the phase of the original clock signal from the clock source 170 once to the first group of PEs in the second NPU 100-2, and may provide a second phase delayed clock signal in which the phase of the original clock signal is delayed twice may be provided to the second group of PEs in the second NPU 100-2.

Referring to FIG. 9, a supply voltage VDD may be input to each circuit unit of the SoC 1000.

In FIG. 9, it is illustrated that a common supply voltage VDD is input, but examples of the present disclosure are not limited thereto.

In some examples, it is also possible to configure a separate or independent supply voltage VDD to be input to each circuitry of the SoC 1000.

In some examples, it is also possible to configure a separate or independent supply voltage VDD to be input to several circuitries of the SoC 1000.

In some examples, it is also possible to configure a second supply voltage different from the first supply voltage to be input to a specific circuitry of the SoC 1000.

Figure 10:
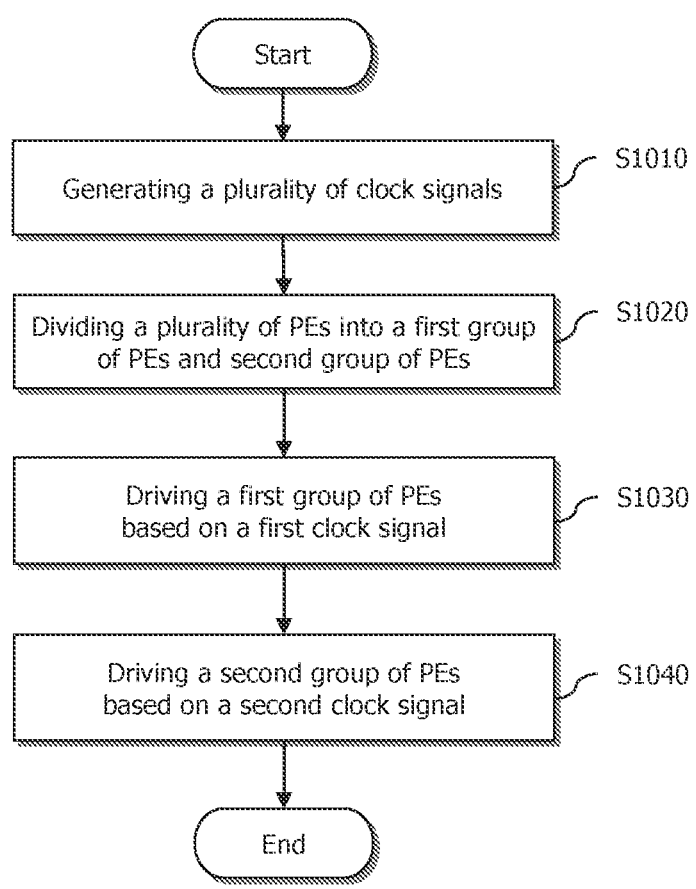
FIG. 10 is an exemplary diagram illustrating a method of operating an NPU according to an example of the present disclosure.

FIG. 10 is an exemplary diagram illustrating a method of operating an NPU according to an example of the present disclosure.

Referring to FIG. 10, a plurality of clock signals for driving a plurality of PEs may be generated S1010.

For description of the operating method of the NPU of FIG. 10, it will also be described with reference to FIGS. 7A and 7B.

Further, the plurality of PEs may be divided into a first group of PEs and a second groups of PEs S1020. It will be apparent that the number of PEs belonging to each group may vary. In addition, the number of PEs belonging to each group may be changed semi-fixedly or dynamically. Such changing operation may be performed under the control of the NPU controller 130.

Subsequently, the first group of PEs may be driven based on the first clock signal S1030. Also, the second group of PEs may be driven based on the second clock signal S1040.

The plurality of clock signals may include an original clock signal and a plurality of phase delayed clock signals having a phase delay from the original clock signal.

A phase difference between the plurality of clock signals may be determined in consideration of peak power of the NPU.

A phase difference between the plurality of clock signals may be determined as a phase difference capable of minimizing peak power of the NPU.

The number of the plurality of clock signals may be preset based on the number of groups of PEs.

The first clock signal for driving the first group of PEs 110-1 may be the original clock signal. Alternatively, the first clock signal for driving the first group of PEs 110-1 may be a first phase delayed clock signal obtained by delaying the phase of the original clock signal once.

When the first clock signal for driving the first group of PEs 110-1 is the original clock signal, the second clock signal for driving the second group of PEs 110-2 may be a first phase delayed clock signal obtained by delaying the phase of the original clock signal once.

On the other hand, when the first clock signal for driving the first group of PEs 110-1 is a first phase delayed clock signal in which the phase of the original clock signal is delayed once, the second clock signal for driving the PEs 110-2 of the second group may be a second phase delayed clock signal obtained by delaying a phase of the original clock signal twice.

As another example, when the first clock signal for driving the first group of PEs 110-1 is a first phase delayed clock signal obtained by delaying the phase of the original clock signal once, the second clock signal for driving the second group of PEs 110-2 may be the original clock signal.

Figure 11:
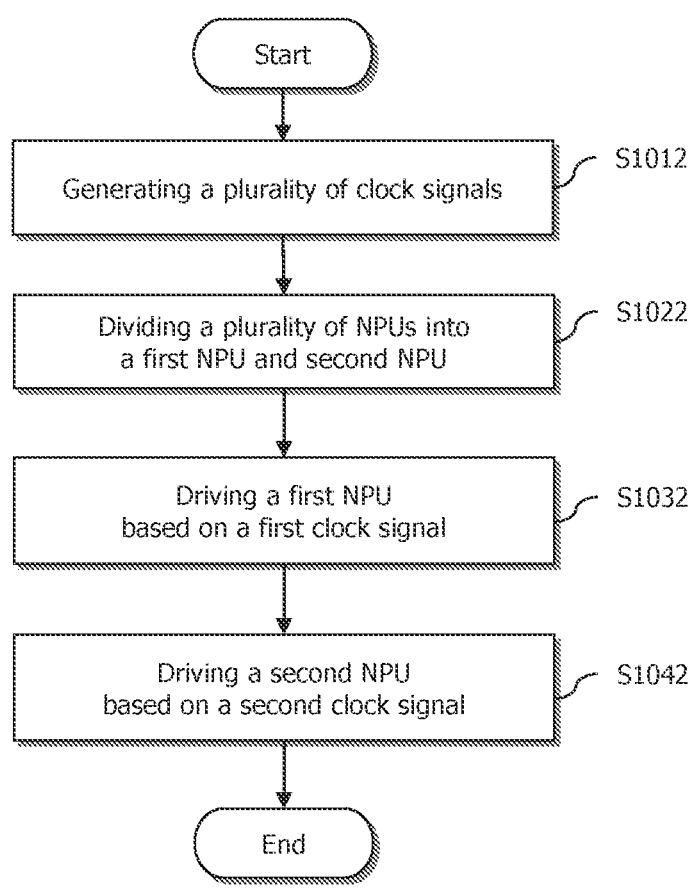
FIG. 11 is an exemplary diagram illustrating a method of operating an NPU according to an example of the present disclosure.

FIG. 11 is an exemplary diagram illustrating a method of operating an NPU according to an example of the present disclosure.

Referring to FIG. 11, a plurality of clock signals for driving a plurality of NPUs may be generated S1012.

For a description of the operating method of the NPU of FIG. 11, it will be described with reference to FIG. 9 as well.

Further, the plurality of NPUs can be divided into a first NPU 100-1 and a second NPU 100-2 S1022. However, it will be apparent that the number of NPUs may vary. In addition, the number of operated NPUs can be changed semi-fixedly or dynamically. Such a change may be performed under the control of the SoC 1000.

Subsequently, the first NPU 100-1 may be driven based on the first clock signal S1032. Also, the second NPU 100-2 may be driven based on the second clock signal S1042.

The plurality of clock signals may include an original clock signal and a plurality of phase delayed clock signals having a phase delay from the original clock signal.

A phase difference between the plurality of clock signals may be determined in consideration of peak power of the NPU.

A phase difference between the plurality of clock signals may be determined as a phase difference capable of minimizing peak power of the SoC.

The number of the plurality of clock signals may be preset based on the number of NPUs.

The first clock signal for driving the first NPU 100-1 may be the original clock signal. Alternatively, the first clock signal for driving the first NPU 100-1 may be a first phase delayed clock signal obtained by delaying the phase of the original clock signal once.

When the first clock signal for driving the first NPU 100-1 is the original clock signal, the second clock signal for driving the second NPU 100-2 may be a first phase delayed clock signal obtained by delaying the phase of the original clock signal once.

On the other hand, when the first clock signal for driving the first NPU 100-1 is a first phase delayed clock signal in which the phase of the original clock signal is delayed once, the second clock signal for driving the second NPU 100-2 may be a second phase delayed clock signal obtained by delaying the phase of the original clock signal twice.

As another example, when the first clock signal for driving the first NPU 100-1 is a first phase delayed clock signal in which the phase of the original clock signal is delayed once, the second clock signal for driving the second NPU 100-2 may be the original clock signal.

In some examples of the present disclosure, a SoC may be configured to include a plurality of NPUs and a first phase shifter. A plurality of NPUs may be configured to reduce peak power by receiving clock signals of different phases. In this case, at least one NPU among the plurality of NPUs may be configured to include a plurality of PEs and a second phase shifter. The at least one NPU may be configured to respectively input clock signals of different phases to corresponding groups of PEs to reduce peak power.

That is, in some examples of the present disclosure, clock signals of different phases may be input to a plurality of NPUs at the SoC level, and at least one NPU of the SoC may be configured to include a plurality of groups of PEs. At this time, at least one group of PEs may be configured to receive a clock signal having a phase delay different from that of the other group of PEs.

Figure 12:
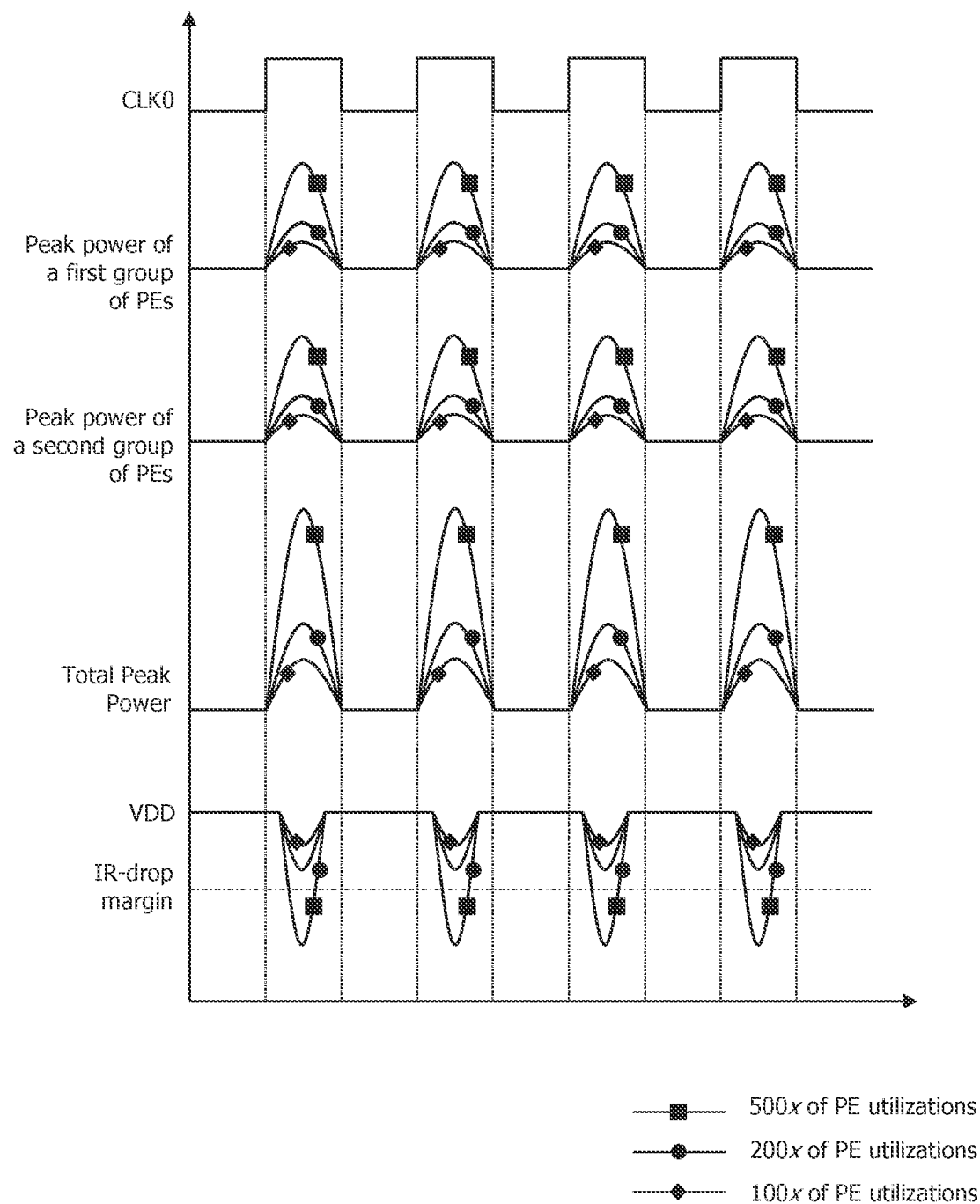
FIG. 12 illustrates a comparative example in which clock signals of different phases are not input to a plurality of PEs of the NPU.

FIG. 12 illustrates a comparative example in which clock signals of different phases are not input to a plurality of PEs of the NPU.

Referring to FIG. 12, the first clock CLK0 may be input to first group of PEs 110-1 and a second group of PEs 110-2. Here, the PEs 110-1 and 110-2 of each group are configured to receive clock signals of the same phase.

100× of PE utilization in FIG. 12 exemplarily illustrates peak power and supply voltage VDD fluctuation characteristics when one hundred processing elements are activated.

200× of PE utilization in FIG. 12 exemplarily illustrates peak power and supply voltage VDD fluctuation characteristics when two hundred processing elements are activated.

500× of PE utilization in FIG. 12 exemplarily illustrates peak power and supply voltage VDD fluctuation characteristics when five hundred processing elements are activated.

Referring to FIG. 12, as the number of activated processing elements of the neural processing unit 100 increases, the peak power increases and the supply voltage VDD tends to fluctuate.

To explain further, the number of PEs operating for each clock cycle may vary depending on the performance of a compiler that compiles an artificial neural network model. That is, the better the performance of the compiler, the more PEs can be operated per one clock cycle. Here, the ratio of operating PEs among all PEs may be referred to as a PE utilization rate (%). Conversely, the higher the performance of the compiler, the higher the peak power of the NPU can be. That is, the peak power may be directly proportional to the operation rate of the PE. Therefore, as the algorithm of the compiler becomes more sophisticated, there is a problem in that the peak power fluctuation of the NPU may further increase.

Referring to FIG. 12, the peak power of the first group of PEs 110-1 and the second group of PEs 110-2 operating based on the first clock CLK0 may vary depending on the number of PEs operating per one clock cycle. That is, peak power may be increased in proportion to the number of PEs operating at one clock cycle.

To elaborate, the NPU developed with low power platform can be developed to correspond to the M.2 interface or the PCI Express interface when applied to edge devices. In particular, in the case of the M.2 interface, the maximum power may be relatively lower than that of the PCI Express interface. For example, an M.2 interface may have a current limit of 3 A and a power limit of 10 W. If the peak power of the NPU of the comparative example exceeds 10 W at a specific clock cycle, the supply voltage VDD supplied to the NPU may fluctuate. In this case, as the operation rate of the PE increases, the peak power of the NPU further increases, and as the peak power exceeds the power limit, the degree of decrease in the supply voltage VDD may increase in proportion to the degree of exceeding the peak power.

If the supply voltage VDD falls below the IR-drop margin, an error may occur in the data being calculated by the NPU. To explain further, IR-drop can occur when a voltage drop (V=IR) occurs according to Ohm's law, which is caused by the resistance (R) of the metal interconnection and the current (I) flowing through it. When a large number of logic gates associated with multiple PEs of an NPU switch simultaneously, the NPU can consume a significant amount of current. This high current can cause a larger voltage drop across the NPU, reducing the supply voltage in other parts of the SoC.

Summarizing the comparative example of FIG. 12, a sufficient IR-drop margin must be secured to ensure stable operation of the NPU and prevent potential errors. The IR-drop margin may mean the difference between the supply voltage VDD and the lowest allowable voltage at any point of the NPU under any peak power conditions.

Figure 13:
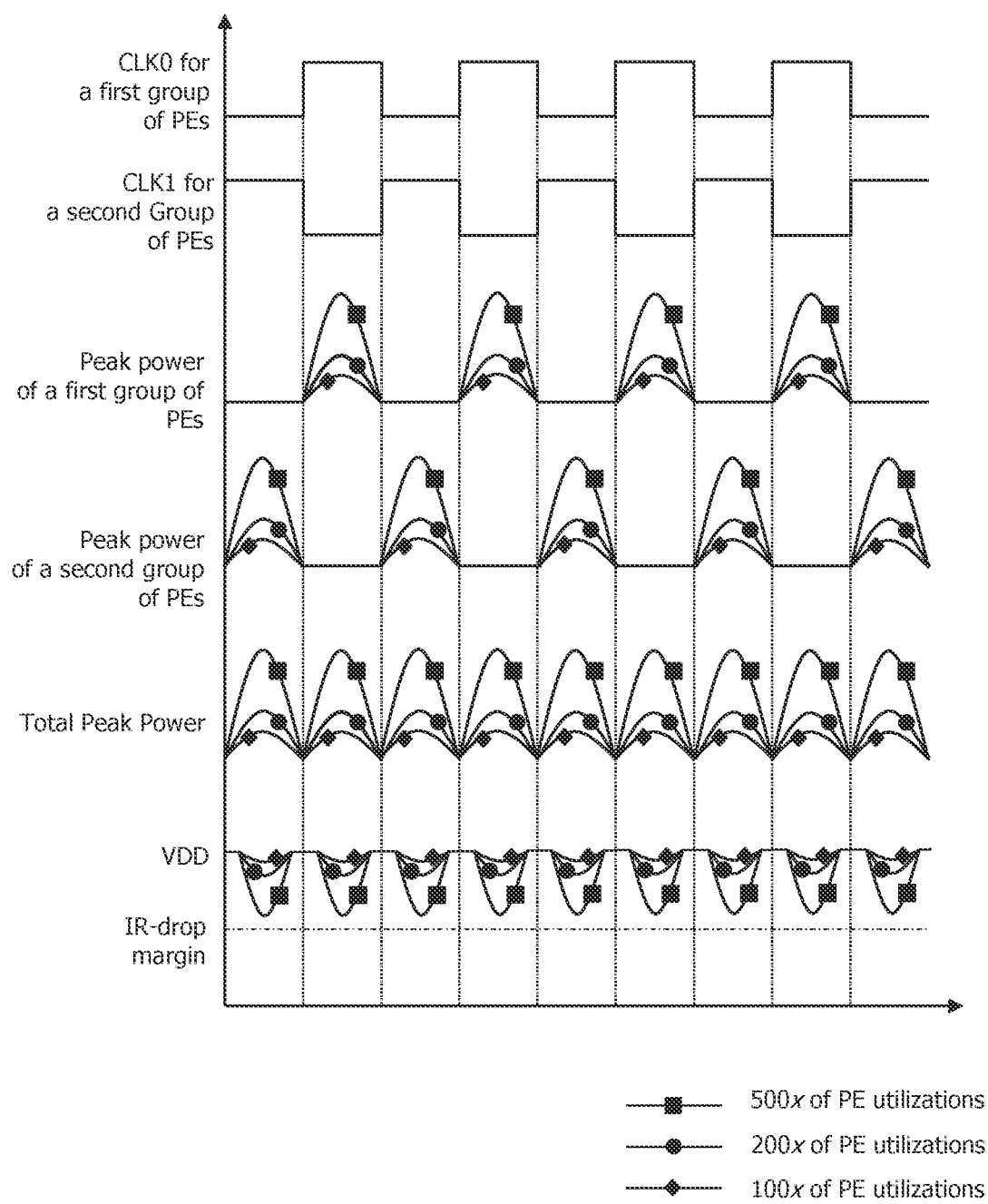
FIG. 13 illustrates an example of inputting clock signals of different phases to a plurality of PEs of an NPU in consideration of peak power according to an example of the present disclosure.

FIG. 13 illustrates an example of inputting clock signals of different phases to a plurality of PEs of an NPU in consideration of peak power according to an example of the present disclosure.

Referring to FIG. 13, the first clock CLK0 may be input to the first group of PEs 110-1, and the second clock CLK1 may be input to the second group of PEs 110-2. Here, the PEs 110-1 and 110-2 of each group are configured to receive clock signals of different phases.

100× of PE utilization in FIG. 13 exemplarily illustrates peak power and supply voltage VDD fluctuation characteristics when one hundred processing elements are activated.

200× of PE utilization in FIG. 13 exemplarily illustrates peak power and supply voltage VDD fluctuation characteristics when two hundred processing elements are activated.

500× of PE utilization in FIG. 13 exemplarily illustrates peak power and supply voltage VDD fluctuation characteristics when five hundred processing elements are activated.

Referring to FIG. 13, as the number of activated processing elements of the neural processing unit 100 increases, the peak power increases and the supply voltage VDD tends to decrease. However, as signal clocks having different phases are input to the PEs of each group, the overall peak power is reduced and the fluctuation of the supply voltage VDD is also reduced.

In other words, the number of PEs operating for each clock cycle may vary depending on the performance of a compiler that compiles an artificial neural network model. That is, the better the performance of the compiler, the more PEs can be operated per one clock cycle. Here, the ratio of operating PEs among all PEs may be referred to as a PE utilization rate (%). Conversely, the higher the performance of the compiler, the higher the peak power of the NPU can be. That is, the peak power may be directly proportional to the operation rate of the PE. Therefore, as the algorithm of the compiler becomes more sophisticated, there is a problem in that the peak power of the NPU may further increase.

Referring to FIG. 13, the peak power of the first group of PEs 110-1 and the second group of PEs 110-2 corresponding to the first clock CLK0 may vary according to the number of PEs operating per clock. That is, peak power may be increased in proportion to the number of PEs operating at one clock cycle.

To elaborate, the NPU developed with low power platform can be developed to correspond to the M.2 interface or the PCI Express interface when applied to edge devices. In particular, in the case of the M.2 interface, the maximum power may be relatively lower than that of the PCI Express interface. For example, an M.2 interface may have a current limit of 3 A and a power limit of 10 W. If the peak power of the NPU of the comparative example exceeds 10 W at a specific clock cycle, the supply voltage VDD supplied to the NPU may fluctuate. In this case, as the operation rate of the PE increases, the peak power of the NPU further increases, and as the peak power exceeds the power limit, the degree of decrease in the supply voltage VDD may increase in proportion to the degree of exceeding the peak power.

If the supply voltage VDD falls below the IR-drop margin, an error may occur in the data being calculated by the NPU.

Meanwhile, the first clock CLK0 may be applied to the first group of PEs 110-1, and the second clock CLK1, which has a different phase from the first clock CLK0, may be applied to the second group of PEs 110-2. Accordingly, the peak power of each group of PEs can be distributed, and the peak power can be reduced by half compared to the comparative example of FIG. 12 in terms of the peak power of the NPU. In this case, stability of the supply voltage VDD may be relatively more stable compared to the comparative example shown in FIG. 12.

That is, according to an example of the present disclosure, the peak power of the NPU may be reduced, and the peak power of the SoC including the NPU may also be reduced.

Also, in the case of low power interfaces like M.2, since the power limit can be low, it can be even more effective in these low power interfaces. However, the present disclosure is not limited to a specific interface circuit.

Brief Summary of Disclosures of the Present Disclosure

The contents of the present disclosure may be summarized and described as follows.

According to an example of the present disclosure, a neural processing unit may be provided. The NPU may comprise a first circuitry including a plurality of processing elements (PEs) configured to perform operations of an artificial neural network model, the plurality of PEs including an adder, a multiplier, and an accumulator, and a clock signal supply circuitry configured to output one or more clock signals. When the plurality of PEs include a first group of PEs and a second group of PEs, a first clock signal among the one or more clock signals, may be supplied to the first group of PEs and a second clock signal among the one or more clock signals, may be supplied to the second group of PEs. At least one of the first and second clock signals may have a preset phase based on a phase of an original clock signal.

The at least one of the first and second clock signals may be generated by shifting, drifting, or delaying the phase of the original clock signal.

The second clock signal may have a second phase different from a first phase of the first clock signal.

The one or more clock signals may include the first clock signal and the second clock signal. The first clock signal may have a first phase different from a second phase of the second clock signal, but has a same phase as the original clock signal.

A phase difference between the first and second clock signals may be determined in consideration of a peak power of the NPU.

The first group of PEs may operate based on a first phase of the first clock signal and the second group of PEs may operate based on a second phase of the second clock signal so as to reduce a peak power of the NPU.

When the plurality of PEs may further include a third group of PEs, a third clock signal among the one or more clock signals, may be supplied to the third group of PEs.

A number of the one or more clock signals may be preset based on a number of groups of the plurality of PEs.

According to an example of the present disclosure, a system-on-chip (SoC) may be provided. The Soc may comprise a semi-conductor substrate, a first circuitry, disposed on the semi-conductor substrate, including a plurality of processing elements (PEs) configured to perform operations of an artificial neural network model, the plurality of PEs including an adder, a multiplier, and an accumulator, and a clock signal supply circuitry, disposed on the semi-conductor substrate, configured to output one or more clock signals. When the plurality of PEs include a first group of PEs and a second group of PEs, a first clock signal among the one or more clock signals, may be supplied to the first group of PEs and a second clock signal among the one or more clock signals, may be supplied to the second group of PEs. At least one of the first and second clock signals may have a preset phase based on a phase of an original clock signal.

The at least one of the first and second clock signals may be generated by shifting, drifting, or delaying the phase of the original clock signal.

The second clock signal may have a second phase different from a first phase of the first clock signal.

The one or more clock signals may include the first clock signal and the second clock signal. The first clock signal may have a first phase different from a second phase of the second clock signal, but has a same phase as the original clock signal.

A phase difference between the first and second clock signals may be determined in consideration of a peak power of the SoC.

The first group of PEs may operate based on a first phase of the first clock signal and the second group of PEs may operate based on a second phase of the second clock signal so as to reduce a peak power of the SoC.

When the plurality of PEs further include a third group of PEs, a third clock signal among the one or more clock signals, may be supplied to the third group of PEs.

A number of the one or more clock signals may be preset based on a number of groups of the plurality of PEs.

A method of operating a neural processing unit (NPU) may be provided. The method of operating a NPU may comprise steps of generating a plurality of clock signals including a first clock signal and a second clock signal; operating a first group of processing elements (PEs) based on the first clock signal; and operating a second group of PEs based on the second clock signal. The PEs of the first and second groups may include an adder, a multiplier, and an accumulator, and may be configured to process operations of an artificial neural network model.

The at least one of the first and second clock signals may be generated by shifting, drifting, or delaying a phase of an original clock signal.

The second clock signal may have a second phase different from a first phase of the first clock signal.

A number of the plurality of clock signals may be preset based on a number of groups of the PEs.

Examples of the present disclosure described in the present disclosure and drawings are merely presented as specific examples to easily explain the technical content of the present disclosure and help understanding of the present disclosure, and are not intended to limit the scope of the present disclosure. It is apparent to those of ordinary skill in the art that other modified examples can be implemented or derived in addition to the examples described.

[National R&D Project Supporting this Invention]
[Task Identification Number] 1711193247
[Task Number] 2022-0-00248-002
[Name of Ministry] Ministry of Science and ICT
[Name of Project Management (Specialized) Institution] Institute of Information & Communications Technology Planning & Evaluation
[Research Project Title] Development of Core Technology for PIM Artificial Intelligence Semiconductor (Design)
[Research Task Title] Development of CXL-based PIM semiconductor technology for multiple DRAM modules considering memory consistency
[Contribution Rate] 1/1
[Name of Organization Performing the Task] DeepX Co., Ltd.
[Research period15 minutes] 2023-1-1~2023-12-31

What is claimed is:

1. A neural processing unit (NPU) comprising:
a first circuitry including a plurality of processing elements (PEs) configured to perform operations of an artificial neural network model, the plurality of PEs including an adder, a multiplier, and an accumulator;
a clock signal supply circuitry configured to output one or more clock signals; and
a second circuitry configured to process a plurality of feature maps outputted from the plurality of PEs,
wherein when the plurality of PEs include a first group of PEs and a second group of PEs, a first clock signal among the one or more clock signals, is supplied to the first group of PEs and a second clock signal among the one or more clock signals, is supplied to the second group of PEs,
wherein the first group of PEs outputs one or more first feature maps to the second circuitry based on the first clock signal,
wherein the second group of PEs outputs one or more second feature maps to the second circuitry based on the second clock signal, and wherein the first clock signal precedes the second clock signal.

2. The NPU of claim 1,
wherein at least one of the first and second clock signals has a preset phase based on a phase of an original clock signal, or
wherein the at least one of the first and second clock signals is generated by shifting, drifting, or delaying the phase of the original clock signal.

3. The NPU of claim 1,
wherein the first clock signal has a first phase different from a second phase of the second clock signal, but has a same phase as an original clock signal, or
wherein the second clock signal has a second phase different from a first phase of the first clock signal.

4. The NPU of claim 1,
wherein the second circuitry processes one or more first feature maps from the first group of PEs and one or more second feature maps from the second group of PEs in a first input first output (FIFO) manner.

5. The NPU of claim 1,
wherein a phase difference between the first and second clock signals is determined in consideration of a peak power of the NPU.

6. The NPU of claim 1,
wherein the first group of PEs operate based on a first phase of the first clock signal and the second group of PEs operate based on a second phase of the second clock signal so as to reduce a peak power of the NPU.

7. The NPU of claim 1,
wherein when the plurality of PEs further include a third group of PEs, a third clock signal among the one or more clock signals, is supplied to the third group of PEs.

8. The NPU of claim 1,
wherein a number of the one or more clock signals is preset based on a number of groups of the plurality of PEs.

9. A system-on-chip (SoC) comprising:
a semi-conductor substrate;
a first circuitry, disposed on the semi-conductor substrate, including a plurality of processing elements (PEs) configured to perform operations of an artificial neural network model, the plurality of PEs including an adder, a multiplier, and an accumulator;
a clock signal supply circuitry, disposed on the semi-conductor substrate, configured to output one or more clock signals; and
a second circuitry, disposed on the semi-conductor substrate, configured to process a plurality of feature maps outputted from the plurality of PEs,
wherein when the plurality of PEs include a first group of PEs and a second group of PEs, a first clock signal among the one or more clock signals, is supplied to the first group of PEs and a second clock signal among the one or more clock signals, is supplied to the second group of PEs,
wherein the first group of PEs outputs one or more first feature maps to the second circuitry based on the first clock signal,
wherein the second group of PEs outputs one or more second feature maps to the second circuitry based on the second clock signal, and
wherein the first clock signal precedes the second clock signal.

10. The SoC of claim 9,
wherein at least one of the first and second clock signals has a preset phase based on a phase of an original clock signal, or
wherein the at least one of the first and second clock signals is generated by shifting, drifting, or delaying the phase of the original clock signal.

11. The SoC of claim 9,
wherein the first clock signal has a first phase different from a second phase of the second clock signal, but has a same phase as an original clock signal, or
wherein the second clock signal has a second phase different from a first phase of the first clock signal.

12. The SoC of claim 9,
wherein the second circuitry processes one or more first feature maps from the first group of PEs and one or more second feature maps from the second group of PEs in a first input first output (FIFO) manner.

13. The SoC of claim 9,
wherein a phase difference between the first and second clock signals is determined in consideration of a peak power of the SoC.

14. The SoC of claim 9,
wherein the first group of PEs operate based on a first phase of the first clock signal and the second group of PEs operate based on a second phase of the second clock signal so as to reduce a peak power of the SoC.

15. The SoC of claim 9,
wherein when the plurality of PEs further include a third group of PEs, a third clock signal among the one or more clock signals, is supplied to the third group of PEs.

16. The SoC of claim 9,
wherein a number of the one or more clock signals is preset based on a number of groups of the plurality of PEs.

17. A method of operating a neural processing unit (NPU), comprising:
generating a plurality of clock signals including a first clock signal and a second clock signal;
operating a first group of processing elements (PEs) based on the first clock signal;
operating a second group of PEs based on the second clock signal,
wherein the PEs of the first and second groups include an adder, a multiplier, and an accumulator, and are configured to process operations of an artificial neural network model,
wherein the first group of PEs outputs one or more first feature maps according to the first clock signal,
wherein the second group of PEs outputs one or more second feature maps according to the second clock signal, and
wherein the first clock signal precedes the second clock signal.

18. The method of claim 17,
wherein at least one of the first and second clock signals has a preset phase based on a phase of an original clock signal, or
wherein the at least one of the first and second clock signals is generated by shifting, drifting, or delaying a phase of an original clock signal.

19. The method of claim 17,
wherein the first clock signal has a first phase different from a second phase of the second clock signal, but has a same phase as an original clock signal, or wherein the second clock signal has a second phase different from a first phase of the first clock signal.

20. The method of claim 17, wherein a number of the plurality of clock signals is preset based on a number of groups of the PEs.

* * * * *